US011483237B2

(12) United States Patent
Dutta

(10) Patent No.: US 11,483,237 B2
(45) Date of Patent: Oct. 25, 2022

(54) BIER TRAFFIC ENGINEERING (BIER-TE) USING UNICAST MPLS-TE TUNNELS

(71) Applicant: Nokia Solutions and Networks OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/394,561

(22) Filed: Apr. 25, 2019

(65) Prior Publication Data
US 2020/0344162 A1  Oct. 29, 2020

(51) Int. Cl.
*H04L 45/60* (2022.01)
*H04L 45/50* (2022.01)
*H04L 45/74* (2022.01)
*H04L 47/724* (2022.01)
*H04L 47/70* (2022.01)
*H04L 45/16* (2022.01)

(52) U.S. Cl.
CPC .............. *H04L 45/60* (2013.01); *H04L 45/16* (2013.01); *H04L 45/507* (2013.01); *H04L 45/74* (2013.01); *H04L 47/724* (2013.01); *H04L 47/825* (2013.01)

(58) Field of Classification Search
CPC ....... H04L 45/60; H04L 45/16; H04L 45/507; H04L 45/74; H04L 47/724; H04L 47/825
USPC ....................................................... 370/311
See application file for complete search history.

(56) References Cited

U.S. PATENT DOCUMENTS

| | | | |
|---|---|---|---|
| 2009/0232031 A1* | 9/2009 | Vasseur | H04L 12/185 370/256 |
| 2015/0139228 A1* | 5/2015 | Wijnands | H04L 45/74 370/390 |
| 2017/0099232 A1* | 4/2017 | Shepherd | H04L 45/745 |
| 2018/0131532 A1* | 5/2018 | Wijnands | H04L 12/1886 |

(Continued)

FOREIGN PATENT DOCUMENTS

WO  WO-2019/010968 A1  1/2019

OTHER PUBLICATIONS

B. Fenner et al., "Protocol Independent Multicast-Sparse Mode(PIM-SM)", Internet Engineering Task Force (IETF), Mar. 2016, https://tools.ietf.org/html/rfc7761.

(Continued)

*Primary Examiner* — Kwang B Yao
*Assistant Examiner* — Xuan Lu
(74) *Attorney, Agent, or Firm* — Harness, Dickey & Pierce, PLC

(57) ABSTRACT

At a router, at least one memory and computer program code stored therein are configured to, with at least one processor, cause the router to: determine source router identification information for a tunnel traversing the router based on a routable source IP address for the tunnel; determine destination router identification information for the tunnel based on a routable destination IP address for the tunnel; program a bit string entry for the tunnel in a Bit Index Forwarding Table (BIFT) for tunnels from a source router to a plurality of destination routers, the BIFT being indexed based on the source router identification information and at least a portion of the destination router identification information; and route packet data received at the router according to the BIFT.

22 Claims, 31 Drawing Sheets

(56) References Cited

U.S. PATENT DOCUMENTS

| | | | |
|---|---|---|---|
| 2018/0205636 A1 | 7/2018 | Hu et al. | |
| 2018/0287934 A1* | 10/2018 | Wang | H04L 12/4633 |
| 2019/0075041 A1* | 3/2019 | Wang | H04L 41/0806 |
| 2020/0153728 A1 | 5/2020 | Xie | |
| 2020/0245206 A1* | 7/2020 | Allan | H04L 45/04 |

OTHER PUBLICATIONS

B. Cain et al., "Internet Group Membership Protocol (IGMP)", Network Working Group, version 3, Oct. 2002, https://tools.ietf.org/html/rfc3376.

R. Aggarwal et al., "Extensions to Resource Reservation Protocol—Traffic Engineering (RSVP-TE) for Point-to-Multipoint TE Label Switched Paths (LSPs)", Network Working Group, May 2007, https://tools.ietf.org/html/rfc4875.

IJ. Wijnands et al., "Multipoint LDP In-Band Signaling for Point-to-Multipoint and Multipoint-to-Multipoint Label Switched Paths", Internet Engineering Task Force (IETF), Jan. 2013, https://tools.ietf.org/html/rfc6826.

IJ. Wijnands et al., "Multicast Using Bit Index Explicit Replication (BIER)", Internet Engineering Task Force (IETF), Nov. 2017, https://tools.ietf.org/html/rfc8279.

IJ. Wijnands et al., "Encapsulation for Bit Index Explicit Replication (BIER) in MPLS and Non-MPLS Networks", Internet Engineering Task Force (IETF), Jan. 2018, https://tools.ietf.org/html/rfc8296.

P. Psenak et al, "OSPFv2 Extensions for Bit Index Explicit Replication (BIER)", Internet Engineering Task Force (IETF), Nov. 2018, https://tools.ietf.org/html/rfc8444.

L. Ginsberg et al., "Bit Index Explicit Replication (BIER) Support via IS-IS", Internet Engineering Task Force (IETF), Jun. 2018, https://tools.ietf.org/html/rfc8401.

Ran. Chen et al., "BGP Link-State extensions for BIER", Networking Working Group, Oct. 8, 2018, https://tools.ietf.org/html/draft-ietf-bier-bgp-ls-bier-ext-04.

E. Rosen et al., "Multicast VPN Using BIER", Internet Engineering Task Force, Mar. 19, 2018, https://tools.ietf.org/html/draft-ietf-bier-mvpn-11.

N. Kumar et al., "BIER Use Cases", Network Working Group, Jul. 28, 2018, https://tools.ietf.org/html/draft-ietf-bier-use-cases-07.

IJ. Wijnands et al., "Multicast Using Bit Index Explicit Replication (BIER)", Internet Engineering Task Force (IETF), Nov. 2017, https://tools.ietf.org/html/rfc8279#page-18.

T. Eckert et al., "Traffic Engineering for Bit Index Explicit Replication (BIER-TE)", Network Working Group, Oct. 23, 2018, https://tools.ietf.org/html/draft-ietf-bier-te-arch-01.

T. Eckert et al., "Protection Methods for BIER-TE", Network Working Group, Mar. 5, 2018, https://tools.ietf.org/html/draft-eckert-bier-te-frr-03.

D. Awduche et al., "RSVP-TE: Extensions to RSVP for LSP Tunnels", Network Working Group, Dec. 2001, https://tools.ietf.org/html/rfc3209.

P. Pan et al., "Fast Reroute Extensions to RSVP-TE for LSP Tunnels", Network Working Group, May 2005, https://tools.ietf.org/html/rfc4090.

A. Farrel, et al., "Encoding of Attributes for MPLS LSP Establishment Using Resource Reservation Protocol Traffic Engineering (RSVP-TE)", Network Working Group, Feb. 2009, https://tools.ietf.org/html/rfc5420.

"Resource Reservation Protocol-Traffic Engineering (RSVP-TE) Parameters", Jan. 23, 2006, https://www.iana.org/assignments/rsvp-te-parameters/rsvp-te-parameters.xhtml#rsvp-te-parameters-1.

Extended European Search Report dated Oct. 22, 2020 issued in European Appln. No. 20170683.5.

\* cited by examiner

```
              BIRT-1 = {SD-0, SI-0}
    ---------------------------------------------
    | BFR-BitString  | BFR-Prefix   | Next-hop  |
    |                | of Dest BFER |           |
    =============================================
1   | 1(0000000001)  |    AR1       |    AR1    |
    ---------------------------------------------
2   | 9(0100000000)  |    AR3       |    AR3    |
    ---------------------------------------------
3   | 7(0001000000)  |    AR4       |    AR3    |
    ---------------------------------------------
4   | 3(0000000100)  |    AR5       |    AR3    |
    ---------------------------------------------
```

FIG. 3A

BIRT-2 = {SD-0, SI-5}

| BFR-BitString | BFR-Prefix of Dest BFER | Next-hop |
|---|---|---|
| 1(0000000001) | AR6 | AR9 |
| 4(0000001000) | AR7 | AR9 |
| 6(0000100000) | AR8 | AR9 |

FIG. 3B

```
              BIRT-3 = {SD-0, SI-9}
---------------------------------------------
| BFR-BitString   | BFR-Prefix   | Next-hop |
|                 | of Dest BFER |          |
=============================================
| 2(0000000010)   |     AR9      |    AR9   |
---------------------------------------------
| 8(0010000000)   |     AR10     |    AR9   |
---------------------------------------------
| 4(0000001000)   |     AR11     |    AR9   |
---------------------------------------------
| 6(0000100000)   |     AR12     |    AR9   |
---------------------------------------------
```

FIG. 3C

| BIRT-4 = {SD-1, SI-0} | | |
|---|---|---|
| BFR-BitString | BFR-Prefix of Dest BFER | Next-hop |
| 1(0000000001) | AR13 | AR13 |
| 5(0000010000) | AR14 | AR13 |
| 9(0100000000) | AR15 | AR13 |
| 7(0001000000) | AR16 | AR13 |
| 3(0000000100) | AR17 | AR13 |

FIG. 3D

```
            BIRT-5 = {SD-1, SI-5}
---------------------------------------------------
| BFR-BitString  |  BFR-Prefix   | Next-hop |
|                |  of Dest BFER |          |
===================================================
| 1(0000000001)  |     AR18      |    AR13  |
---------------------------------------------------
| 6(0000100000)  |     AR19      |    AR13  |
---------------------------------------------------
| 4(0000001000)  |     AR20      |    AR13  |
---------------------------------------------------
```

FIG. 3E

```
              BIFT-1 = {SD-0, SI-0}
------------------------------------------------
| BFR-BitString  |    F-BM     | Next-hop |
|                |             |          |
================================================
|  1(0000000001) | 0000000001  |   AR1    |
------------------------------------------------
|  3(0000000100) | 0101000100  |   AR3    |
------------------------------------------------
|  7(0001000000) | 0101000100  |   AR3    |
------------------------------------------------
|  9(0100000000) | 0101000100  |   AR3    |
------------------------------------------------
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|               BIFT-id                 | TC  |S|    TTL        |
+-+-+-+-+-+-+-+-+-+-+-+-+-+-+-+-+-+-+-+-+-+-+-+-+-+-+-+-+-+-+-+-+
|Nibble | Ver   | BSL   |               Entropy                 |
+-+-+-+-+-+-+-+-+-+-+-+-+-+-+-+-+-+-+-+-+-+-+-+-+-+-+-+-+-+-+-+-+
|OAM|Rsv|   DSCP    |   Proto   |           BFIR-id             |
+-+-+-+-+-+-+-+-+-+-+-+-+-+-+-+-+-+-+-+-+-+-+-+-+-+-+-+-+-+-+-+-+
|                    BitString  (first 32 bits)                ~
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
~                    BitString  (last 32 bits)                  |
+-+-+-+-+-+-+-+-+-+-+-+-+-+-+-+-+-+-+-+-+-+-+-+-+-+-+-+-+-+-+-+-+
```

FIG. 6

```
+-+-+-+-+-+-+-+-+-+-+-+-+-+-+-+-+-+-+-+-+-+-+-+-+-+-+-+-+-+-+-+-+
//     Ethernet Header with Ethertype = MPLS (0x8847 or 0x8848)  //
+-+-+-+-+-+-+-+-+-+-+-+-+-+-+-+-+-+-+-+-+-+-+-+-+-+-+-+-+-+-+-+-+
|              Label 1                  | EXP |S|     TTL         |
+-+-+-+-+-+-+-+-+-+-+-+-+-+-+-+-+-+-+-+-+-+-+-+-+-+-+-+-+-+-+-+-+
~                                                                ~
+-+-+-+-+-+-+-+-+-+-+-+-+-+-+-+-+-+-+-+-+-+-+-+-+-+-+-+-+-+-+-+-+
|             Label N-1                 | EXP |S|     TTL         |
+-+-+-+-+-+-+-+-+-+-+-+-+-+-+-+-+-+-+-+-+-+-+-+-+-+-+-+-+-+-+-+-+
|         Label N (BIFT-id)             | TC  |S|     TTL         |
+-+-+-+-+-+-+-+-+-+-+-+-+-+-+-+-+-+-+-+-+-+-+-+-+-+-+-+-+-+-+-+-+
|Nibble | Ver  | BSL   |              Entropy                    |
+-+-+-+-+-+-+-+-+-+-+-+-+-+-+-+-+-+-+-+-+-+-+-+-+-+-+-+-+-+-+-+-+
|OAM|Rsv|  DSCP   |  Proto   |           BFIR-id                  |
+-+-+-+-+-+-+-+-+-+-+-+-+-+-+-+-+-+-+-+-+-+-+-+-+-+-+-+-+-+-+-+-+
|              BitString  (first 32 bits)                        ~
+-+-+-+-+-+-+-+-+-+-+-+-+-+-+-+-+-+-+-+-+-+-+-+-+-+-+-+-+-+-+-+-+
~                                                                ~
+-+-+-+-+-+-+-+-+-+-+-+-+-+-+-+-+-+-+-+-+-+-+-+-+-+-+-+-+-+-+-+-+
~              BitString  (last 32 bits)                         |
+-+-+-+-+-+-+-+-+-+-+-+-+-+-+-+-+-+-+-+-+-+-+-+-+-+-+-+-+-+-+-+-+
```

FIG. 7

```
               TE-BIFT-1 @{SD-1, SI-5}
------------------------------------------------------------
|     BitString       |      F-BM       |   Next-hop   |
|                     |                 |              |
============================================================
|  1 (000000000000001) | 000000000000001 | Local        |
------------------------------------------------------------
| 11 (000010000000000) | 000010000000000 | BR1->BR3     |
------------------------------------------------------------
| 13 (001000000000000) | 001000000000000 | BR1->BR5     |
------------------------------------------------------------
| 15 (100000000000000) | 100000000000000 | BR1->BR2     |
------------------------------------------------------------
```

FIG. 9

TE-BIFT-2 @{SD-1, SI-5}

| BitString | F-BM | Next-Hop |
|---|---|---|
| 2 (…..) | ………. . | Local |
| 16 (…) | ……. | BR2->BR1 |
| 23 (…) | ……… | R2->R5 |

FIG. 10A

TE-BIFT-3 @{SD-1, SI-5}

| BitString | F-BM | Next-Hop |
|---|---|---|
| 3 (…..) | ………. . | Local |
| 10 (…) | ……. | BR3->BR1 |
| 17 (…) | ……… | BR3->BR4 |

FIG. 10B

TE-BIFT-4 @{SD-1, SI-5}

| BitString | F-BM | Next-Hop |
|---|---|---|
| 4 (…..) | ………. . | Local |
| 18 (…) | ……. | BR4->BR3 |
| 12 (…) | ……… | BR4->BR1 |
| 19 (..) | | BR4->BR5 |
| 21 (..) | | BR4->BR7 |

FIG. 10C

TE-BIFT-5 @{SD-1, SI-5}

| BitString | F-BM | Next-Hop |
|---|---|---|
| 5 (…..) | ………. . | Local |
| 14 (…) | ……. | BR5->BR1 |
| 20 (…) | ……… | BR5->BR4 |
| 24 (..) | | BR5->BR2 |
| 26 (..) | | BR5->BR6 |
| 30 (..) | | BR5->BR7 |
| 28 (..) | | BR5->BR8 |

FIG. 10D

TE-BIFT-6 @{SD-1, SI-5}

| BitString | F-BM | Next-Hop |
|---|---|---|
| 6 (…..) | ………. . | Local |
| 27 (…) | ……. | BR6->BR5 |

FIG. 10E

TE-BIFT-7 @{SD-1, SI-5}

| BitString | F-BM | Next-Hop |
|---|---|---|
| 7 (....) | ........ | Local |
| 22 (...) | ...... | BR7->BR4 |
| 31 (..) | ........ | BR7->BR5 |
| 32 (..) | ........ | BR7->BR8 |

FIG. 10F

TE-BIFT-8 @{SD-1, SI-5}

| BitString | F-BM | Next-Hop |
|---|---|---|
| 8 (....) | ........ | Local |
| 27 (...) | ...... | BR8->BR5 |
| 33 (..) | | BR8->BR7 |

FIG. 10G

TE-BIFT-R1 @ {srcSD=1, srcSI=0, srcBitString=1, dstSD=1, dstSI=0}

| BitString | F-BM | Next-Hop |
|---|---|---|
| 1 (0x0000000001) | 0x0001001001 | R1->R3 (i.e. next-hop@LSP_R1_R6_1) |
| 2 (0x0000000010) | 0x0100100010 | R1->R2 (i.e. next-hop@LSP_R1_R6_2) |
| 3 (0x0000000100) | 0x0000010100 | R1->R5 (i.e. next-hop@LSP_R1_R6_3) |
| 4 (0x0000001000) | 0x0001001001 | R1->R3 (i.e. next-hop@LSP_R1_R7_4) |
| 5 (0x0000010000) | 0x0000010100 | R1->R5 (i.e. next-hop@LSP_R1_R7_5) |
| 6 (0x0000100000) | 0x0100100010 | R1->R2 (i.e. next-hop@LSP_R1_R7_6) |
| 7 (0x0001000000) | 0x0001001001 | R1->R3 (i.e. next-hop@LSP_R1_R8_7) |
| 8 (0x0010000000) | 0x0010000000 | R1->R4 (i.e. next-hop@LSP_R1_R8_8) |
| 9 (0x0100000000) | 0x0100100010 | R1->R2 (i.e. next-hop@LSP_R1_R8_9) |

Figure 13A

TE-BIFT-R2 @ {srcSD=1, srcSI=0, srcBitString=1, dstSD=1, dstSI=0}

| BitString | F-BM | Next-Hop |
|---|---|---|
| 2 (0x0000000010) | 0x0100100010 | R2->R5 (i.e. next-hop@LSP_R1_R6_2) |
| 6 (0x0000100000) | 0x0100100010 | R2->R5 (i.e. next-hop@LSP_R1_R7_6) |
| 9 (0x0100000000) | 0x0100100010 | R2->R5 (i.e. next-hop@LSP_R1_R8_9) |

Figure 13B

TE-BIFT-R3 @ {srcSD=1, srcSI=0, srcBitString=1, dstSD=1, dstSI=0}

| BitString | F-BM | Next-Hop |
|---|---|---|
| 1 (0x0000000001) | 0x0001001001 | R3->R4 (i.e. next-hop@LSP_R1_R6_1) |
| 4 (0x0000001000) | 0x0001001001 | R3->R4 (i.e. next-hop@LSP_R1_R7_4) |
| 7 (0x0001000000) | 0x0001001001 | R3->R4 (i.e. next-hop@LSP_R1_R8_7) |

Figure 13C

TE-BIFT-R4 @ {srcSD=1, srcSI=0, srcBitString=1, dstSD=1, dstSI=0}

| BitString | F-BM | Next-Hop |
|---|---|---|
| 1 (0x0000000001) | 0x0001000001 | R4->R5 (i.e. next-hop@LSP_R1_R6_1) |
| 4 (0x0000001000) | 0x0000001000 | R4->R7 (i.e. next-hop@LSP_R1_R7_4) |
| 7 (0x0001000000) | 0x0001000001 | R4->R5 (i.e. next-hop@LSP_R1_R8_7) |

Figure 13D

TE-BIFT-R5 @ {srcSD=1, srcSI=0, srcBitString=1, dstSD=1, dstSI=0}

| BitString | F-BM | Next-Hop |
|---|---|---|
| 1 (0x0000000001) | 0x0000000111 | R5->R6 (i.e. next-hop@LSP_R1_R6_1) |
| 2 (0x0000000010) | 0x0000000111 | R5->R6 (i.e. next-hop@LSP_R1_R6_2) |
| 3 (0x0000000100) | 0x0000000111 | R5->R6 (i.e. next-hop@LSP_R1_R6_3) |
| 5 (0x0000010000) | 0x0000110000 | R5->R7 (i.e. next-hop@LSP_R1_R7_5) |
| 6 (0x0000100000) | 0x0100110000 | R5->R7 (i.e. next-hop@LSP_R1_R7_6) |
| 7 (0x0001000000) | 0x0111000000 | R5->R8 (i.e. next-hop@LSP_R1_R8_7) |
| 8 (0x0010000000) | 0x0111000000 | R5->R8 (i.e. next-hop@LSP_R1_R8_8) |
| 9 (0x0100000000) | 0x0111000000 | R5->R8 (i.e. next-hop@LSP_R1_R8_9) |

Figure 13E

TE-BIFT-R6 @ {srcSD=1, srcSI=0, srcBitString=1, dstSD=1, dstSI=0}

| BitString | F-BM | Next-Hop |
|---|---|---|
| 1 (0x0000000001) | 0x0000000111 | Local (i.e. destination@LSP_R1_R6_1) |
| 2 (0x0000000010) | 0x0000000111 | Local (i.e. destination@LSP_R1_R6_2) |
| 3 (0x0000000100) | 0x0000000111 | Local (i.e. destination@LSP_R1_R6_3) |

Figure 13F

TE-BIFT-R7 @ {srcSD=1, srcSI=0, srcBitString=1, dstSD=1, dstSI=0}

| BitString | F-BM | Next-Hop |
|---|---|---|
| 4 (0x0000001000) | 0x0000111000 | Local (i.e. destination@LSP_R1_R7_4) |
| 5 (0x0000010000) | 0x0000111000 | Local (i.e. destination@LSP_R1_R7_5) |
| 6 (0x0000100000) | 0x0000111000 | Local (i.e. destination@LSP_R1_R7_6) |

Figure 13G

TE-BIFT-R8 @ {srcSD=1, srcSI=0, srcBitString=1, dstSD=1, dstSI=0}

| BitString | F-BM | Next-Hop |
|---|---|---|
| 7 (0x0001000000) | 0x0111000000 | Local (i.e. destination@LSP_R1_R8_7) |
| 8 (0x0010000000) | 0x0111000000 | Local (i.e. destination@LSP_R1_R8_8) |
| 9 (0x0100000000) | 0x0111000000 | Local (i.e. destination@LSP_R1_R8_9) |

Figure 13H

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            BIFT-id (dstSD, dstSI)     | TC |S|     TTL         |
+-+-+-+-+-+-+-+-+-+-+-+-+-+-+-+-+-+-+-+-+-+-+-+-+-+-+-+-+-+-+-+-+
|Nibble |Ver/type| BSL   |              Entropy                  |
+-+-+-+-+-+-+-+-+-+-+-+-+-+-+-+-+-+-+-+-+-+-+-+-+-+-+-+-+-+-+-+-+
|OAM|Rsv|  DSCP   |   Proto   | BFIR-id (srcSI: srcBitString)|
+-+-+-+-+-+-+-+-+-+-+-+-+-+-+-+-+-+-+-+-+-+-+-+-+-+-+-+-+-+-+-+-+
|   BFIR-SD (srcSD)         |              RESERVED              |
+-+-+-+-+-+-+-+-+-+-+-+-+-+-+-+-+-+-+-+-+-+-+-+-+-+-+-+-+-+-+-+-+
|            BitString  (first 32 bits) (BitString)              ~
+-+-+-+-+-+-+-+-+-+-+-+-+-+-+-+-+-+-+-+-+-+-+-+-+-+-+-+-+-+-+-+-+
~                                                                ~
+-+-+-+-+-+-+-+-+-+-+-+-+-+-+-+-+-+-+-+-+-+-+-+-+-+-+-+-+-+-+-+-+
~            BitString  (last 32 bits) (BitString)               |
+-+-+-+-+-+-+-+-+-+-+-+-+-+-+-+-+-+-+-+-+-+-+-+-+-+-+-+-+-+-+-+-+
```

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type(=2=BIER-TE Attribute) |       Length (variable)       |
+-+-+-+-+-+-+-+-+-+-+-+-+-+-+-+-+-+-+-+-+-+-+-+-+-+-+-+-+-+-+-+-+
|                            BitString                          |
~                                                               ~
+-+-+-+-+-+-+-+-+-+-+-+-+-+-+-+-+-+-+-+-+-+-+-+-+-+-+-+-+-+-+-+-+
```

FIG. 25

BIER TRAFFIC ENGINEERING (BIER-TE) USING UNICAST MPLS-TE TUNNELS

BACKGROUND

Multicast is a method of sending packets to a group of interested receivers in a single transmission. Multicast uses network infrastructure more efficiently by requiring the source to send a packet only once, even if the packet needs to be delivered to a relatively large number of receivers. The nodes in the network replicate the packet to multiple receivers when necessary.

SUMMARY

At least one example embodiment provides a router comprising: at least one processor and at least one memory including computer program code. The at least one memory and the computer program code are configured to, with the at least one processor, cause the router to: determine source router identification information for a tunnel (e.g., a Multiprotocol Label Switching-Traffic Engineering (MPLS-TE) tunnel) traversing the router based on a routable source IP address for the tunnel; determine destination router identification information for the tunnel based on a routable destination IP address for the tunnel; program a bit string entry for the tunnel in a Bit Index Forwarding Table (BIFT) (e.g., a Traffic Engineering-Bit Index Forwarding Table (TE-BIFT)) for tunnels from a source router to a plurality of destination routers, the BIFT being indexed based on the source router identification information and at least a portion of the destination router identification information; and route packet data received at the router according to the BIFT.

At least one example embodiment provides a router comprising: means for determining source router identification information for a tunnel (e.g., a Multiprotocol Label Switching-Traffic Engineering (MPLS-TE) tunnel) traversing the router based on a routable source IP address for the tunnel; means for determining destination router identification information for the tunnel based on a routable destination IP address for the tunnel; means for programming a bit string entry for the tunnel in a Bit Index Forwarding Table (BIFT) (e.g., a Traffic Engineering-Bit Index Forwarding Table (TE-BIFT)) for tunnels from a source router to a plurality of destination routers, the BIFT being indexed based on the source router identification information and at least a portion of the destination router identification information; and means for routing packet data received at the router according to the BIFT.

At least one example embodiment provides a method comprising: determining source router identification information for a tunnel (e.g., Multiprotocol Label Switching-Traffic Engineering (MPLS-TE) tunnel) traversing the router based on a routable source IP address for the tunnel; determining destination router identification information for the tunnel based on a routable destination IP address for the tunnel; programming a bit string entry for the tunnel in a Bit Index Forwarding Table (BIFT) (e.g., Traffic Engineering-Bit Index Forwarding Table (TE-BIFT)) for tunnels from a source router to a plurality of destination routers, the BIFT being indexed based on the source router identification information and at least a portion of the destination router identification information; and routing packet data received at the router according to the BIFT.

At least one example embodiment provides a non-transitory computer-readable storage medium storing computer-readable instructions that, when executed by at least one processor at a router, cause the router to perform a method comprising: determining source router identification information for a tunnel (e.g., a Multiprotocol Label Switching-Traffic Engineering (MPLS-TE) tunnel) traversing the router based on a routable source IP address for the tunnel; determining destination router identification information for the tunnel based on a routable destination IP address for the tunnel; programming a bit string entry for the tunnel in a Bit Index Forwarding Table (BIFT) (e.g., a Traffic Engineering-Bit Index Forwarding Table (TE-BIFT)) for tunnels from a source router to a plurality of destination routers, the BIFT being indexed based on the source router identification information and at least a portion of the destination router identification information; and routing packet data received at the router according to the BIFT.

According to at least some example embodiments, the bit string entry for the MPLS-TE tunnel may be generated in response to a Bit Index Explicit Replication-Traffic Engineering (BIER-TE) capability attribute received in a Resource Reservation Protocol-Traffic Engineering (RSVP-TE) path message for the MPLS-TE tunnel.

A bit string value for the MPLS-TE tunnel may be generated based on a BIER-TE bit string attribute received in a RSVP-TE path message for the MPLS-TE tunnel, and the bit string value may be programmed as the bit string entry for the MPLS-TE tunnel.

The source router identification information may include a source subdomain, a source set identifier and a source bit string associated with a source router for the MPLS-TE tunnel.

The destination router identification information may include a destination subdomain, a destination set identifier and a destination bit string associated with a destination router for the MPLS-TE tunnel.

Whether a MPLS label has been allocated for the destination subdomain and the destination set identifier may be determined, and a MPLS label for the destination subdomain and the destination set identifier may be allocated in response to determining that a MPLS label has not been allocated for the destination subdomain and the destination set identifier.

Whether the TE-BIFT exists may be determined prior to programming the bit string entry for the MPLS-TE tunnel, and the TE-BIFT may be generated in response to determining that the TE-BIFT does not exist.

At least one other example embodiment provides a router comprising at least one processor and at least one memory including computer program code. The at least one memory and the computer program code are configured to, with the at least one processor, cause the router to: segregate a plurality of tunnels (e.g., MPLS-TE tunnels) originating from the router into a plurality of subsets of tunnels based on destination subdomain and set identification information for the plurality of tunnels; encode bit strings of tunnels in a first subset of tunnels among the plurality of subsets of tunnels to generate a first tunnel bit string; generate a BIER (e.g., a BIER-TE) packet for an adjacency next-hop of at least a first of the plurality of tunnels corresponding to the first tunnel bit string; and send the BIER packet to the adjacency next-hop.

At least one other example embodiment provides a router comprising: means for segregating a plurality of tunnels (e.g., MPLS-TE tunnels) originating from the router into a plurality of subsets of tunnels based on destination subdomain and set identification information for the plurality of tunnels; means for encoding bit strings of tunnels in a first subset of tunnels among the plurality of subsets of tunnels to generate a first tunnel bit string; means for generating a BIER (e.g., a BIER-TE) packet for an adjacency next-hop of at least a first of the plurality of tunnels corresponding to the first tunnel bit string; and means for sending the BIER packet to the adjacency next-hop.

At least one other example embodiment provides a method comprising: segregating a plurality of tunnels (e.g., MPLS-TE tunnels) from a source router into a plurality of subsets of tunnels based on destination subdomain and set identification information for the plurality of tunnels; encoding bit strings of tunnels in a first subset of tunnels among the plurality of subsets of tunnels to generate a first tunnel bit string; generating a BIER (e.g., a BIER-TE) packet for an adjacency next-hop of at least a first of the plurality of tunnels corresponding to the first tunnel bit string; and sending the BIER packet to the adjacency next-hop.

At least one other example embodiment provides a non-transitory computer-readable storage medium storing computer-readable instructions that, when executed by at least one processor at a router, cause the router to perform a method comprising: segregating a plurality of tunnels (e.g., MPLS-TE tunnels) from a source router into a plurality of subsets of tunnels based on destination subdomain and set identification information for the plurality of tunnels; encoding bit strings of tunnels in a first subset of tunnels among the plurality of subsets of tunnels to generate a first tunnel bit string; generating a BIER (e.g., s BIER-TE) packet for an adjacency next-hop of at least a first of the plurality of tunnels corresponding to the first tunnel bit string; and sending the BIER packet to the adjacency next-hop.

According to one or more example embodiments, the MPLS-TE tunnels in the first subset of MPLS-TE tunnels have a same destination subdomain and destination set identifier.

A first bit position in the first tunnel bit string may be identified, and the adjacency next-hop may be obtained from a TE-BIFT entry based on the first bit position in the first tunnel bit string.

The first bit position may be converted into an integer index, and the TE-BIFT entry may be looked up based on the integer index to obtain the adjacency next-hop.

A subset tunnel bit string may be generated based on the first tunnel bit string, wherein the subset tunnel bit string includes set bit positions corresponding to only MPLS-TE tunnels sharing the adjacency next-hop; a BIER-TE header for the BIER-TE packet may be generated, wherein the BIER-TE header includes source router identification information for at least the first of the plurality of MPLS-TE tunnels, destination subdomain and set identifier information for at least the first of the plurality of MPLS-TE tunnels, and the subset tunnel bit string; and the BIER-TE packet may include the BIER-TE header and a payload.

Set bit positions corresponding to the MPLS-TE tunnels sharing the adjacency next-hop may be removed from the first tunnel bit string.

At least one example embodiment provides a router comprising: at least one processor; and at least one memory including computer program code. The at least one memory and the computer program code are configured to, with the at least one processor, cause the router to: parse a BIER (e.g., a BIER-TE) header of a received BIER (e.g., a BIER-TE) packet to obtain source router identification information and destination router identification information for a tunnel bit string included in the BIER header, the tunnel bit string representing a set of tunnels (e.g., MPLS-TE tunnels), the destination router identification information including destination subdomain and set identifier information for the set of tunnels; identify a BIFT (e.g., a TE-BIFT) based on at least the source router identification information and the destination router identification information; identify a first bit position in the tunnel bit string included in the BIER header; determine a bit string entry in the BIFT based on the first bit position in the tunnel bit string; obtain an adjacency next-hop for a payload of the received BIER packet based on the bit string entry in the BIFT; and send a BIER packet including the payload to the adjacency next-hop.

At least one example embodiment provides a router comprising: means for parsing a BIER (e.g., a BIER-TE) header of a received BIER (e.g., a BIER-TE) packet to obtain source router identification information and destination router identification information for a tunnel bit string included in the BIER header, the tunnel bit string representing a set of tunnels, the destination router identification information including destination subdomain and set identifier information for the set of tunnels; means for identifying a BIFT (e.g., a TE-BIFT) based on at least the source router identification information and the destination router identification information; means for identifying a first bit position in the tunnel bit string included in the BIER header; means for determining a bit string entry in the BIFT based on the first bit position in the tunnel bit string; means for obtaining an adjacency next-hop for a payload of the received BIER packet based on the bit string entry in the BIFT; and means for sending a BIER packet including the payload to the adjacency next-hop.

At least one example embodiment provides a method comprising: parsing a BIER (e.g., a BIER-TE) header of a received BIER (e.g., a BIER-TE) packet to obtain source router identification information and destination router identification information for a tunnel bit string included in the BIER header, the tunnel bit string representing a set of tunnels, the destination router identification information including destination subdomain and set identifier information for the set of tunnels; identifying a BIFT (e.g., a TE-BIFT) based on at least the source router identification information and the destination router identification information; identifying a first bit position in the tunnel bit string included in the BIER header; determining a bit string entry in the BIFT based on the first bit position in the tunnel bit string; means for obtaining an adjacency next-hop for a payload of the received BIER packet based on the bit string entry in the BIFT; and sending a BIER packet including the payload to the adjacency next-hop.

At least one example embodiment provides a non-transitory computer-readable storage medium storing computer-readable instructions that, when executed by at least one processor at a router, cause the router to perform a method comprising: parsing a BIER (e.g., a BIER-TE) header of a received BIER (e.g., a BIER-TE) packet to obtain source router identification information and destination router identification information for a tunnel bit string included in the BIER header, the tunnel bit string representing a set of tunnels, the destination router identification information including destination subdomain and set identifier information for the set of tunnels; identifying a BIFT (e.g., a TE-BIFT) based on at least the source router identification information and the destination router identification information; identifying a first bit position in the tunnel bit string included in the BIER header; determining a bit string entry in the BIFT based on the first bit position in the tunnel bit string; means for obtaining an adjacency next-hop for a payload of the received BIER packet based on the bit string entry in the BIFT; and sending a BIER packet including the payload to the adjacency next-hop.

According to at least some example embodiments, a subset tunnel bit string may be generated based on the bit string entry in the TE-BIFT, wherein the subset tunnel bit string includes set bit positions corresponding to only MPLS-TE tunnels sharing the adjacency next-hop; a BIER-TE header for the BIER-TE packet may be generated, wherein the BIER-TE header includes the source router identification information, the destination router identification information, and the subset tunnel bit string; and the BIER-TE packet including the BIER-TE header and the payload may be generated.

The first bit position may be converted into an integer index, and the bit string entry may be looked up in the TE-BIFT based on the integer index.

The BIER-TE header may include a subset tunnel bit string, the subset tunnel bit string including set bit positions corresponding to only MPLS-TE tunnels sharing the router as a preceding adjacency next-hop.

Set bit positions corresponding to the MPLS-TE tunnels sharing the adjacency next-hop may be removed from the tunnel bit string included in the BIER-TE header.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

FIGS. 3A through 3E show example Bit Index Routing Tables (BIRTs) for router AR2 in FIG. 2.

FIG. 4 shows an example of a Bit Index Forwarding Table (BIFT) that is derived from the BIRT in FIG. 3A.

FIG. 6 illustrates example encoding of a BIER header.

FIG. 7 illustrates example encoding of a BIER header on a Multiprotocol Label Switching (MPLS) label stack.

FIG. 9 illustrates an example TE-BIFT programmed by the router BR1 for SubDomain and Set-id {SD-1, SI-5}.

FIGS. 10A through 10G illustrate example BIFTs programmed for SubDomain and Set-id {SD-1, SI-5} in routers BR2-BR8, respectively.

FIGS. 13A through 13H illustrate example TE-BIFTs.

FIG. 14 illustrates an example BIER-TE header for a BIER-TE packet.

FIG. 25 illustrates an example format of a BIER-TE Attribute Type, Length, Value, according to example embodiments.

Figure 1:
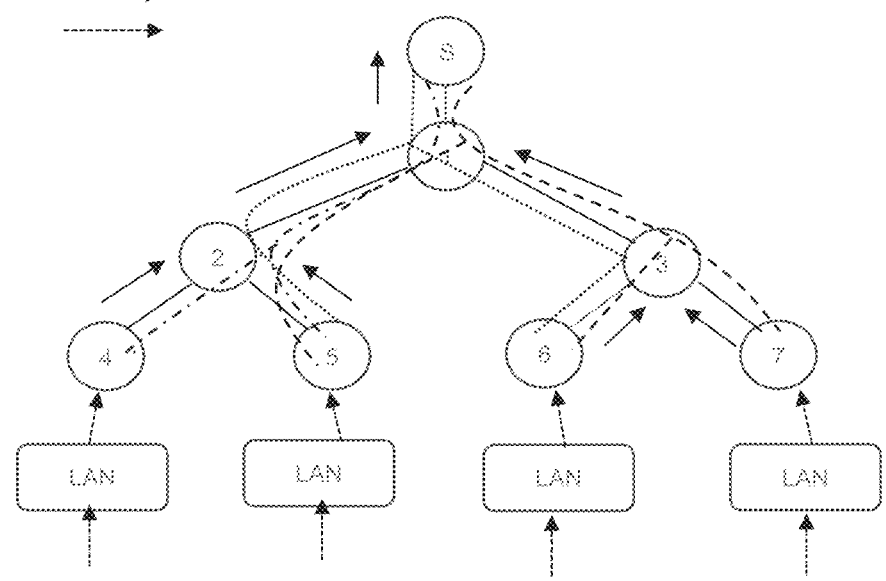
FIG. 1 illustrates three multicast flows from source to respective group addresses in a portion of a network.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Internet Protocol (IP) multicast is the IP-specific version of the general concept of multicast networking. IP multicast uses reserved multicast address blocks in IPv4 and IPv6 as the destination address (group address G) in the IP header. In Point-to-Multipoint (P2MP) IP multicast, a single IP packet is sent by a source S to the group address G, and the single IP packet is received by all nodes that are members of the group address G. Paths from a source S to the group address G constitutes a flow, which may be described as (S,G).

Flows are set-up by the IP multicast control plane. The control plane for IP multicast may include several control protocols such as Protocol Independent Multicast (PIM), Internet Group Membership Protocol (IGMP), or the like.

FIG. 1 illustrates three multicast flows from source S to respective group addresses G1, G2, G3 in a portion of a network. Flow (S, G1) from source S to group address G1 is a multicast flow from source S to egress routers 5 and 6. Flow (S, G2) from source S to group address G2 is a multicast flow from source S to egress routers 4 and 5. Flow (S, G3) from source S to group address G3 is a multicast flow from source S to egress routers 5, 6 and 7.

Egress routers rely on IGMP to learn interests of locally connected hosts/receivers (e.g., in the Local Area Network (LAN)) for a group address. Egress routers then initiate a join request (e.g., "(S,G) join") towards the source S using PIM. The PIM join traverses the nodes along the shortest path to source S, while installing flow (S,G) state in the control and data plane of the traversed nodes. This results in a Multicast Distribution Tree (MDT) for the flow (S,G), where the root is source S and every leaf node is an egress router interested in group address G.

In the example shown in FIG. 1, if egress routers 4 and 5 receive interest on flow (S, G2) through an IGMP request from host(s) in their LANs, this triggers routers 4 and 5 to initiate a PIM join for flow (S, G2) towards router 2, since router 2 is the next-hop in the shortest path towards S. In response to the PIM join, router 2 installs a state for flow (S, G2) in both the control plane and data plane with routers 4 and 5 as downstream routers. Router 2 then sends a PIM join to router 1, which is the next-hop in the shortest path towards S, in response to which router 1 installs a state for flow (S, G2) in a similar way as with router 2. Router 1 then sends a PIM join to source S and source S creates the state for flow (S, G2) with router 1 as the downstream router to complete the MDT for flow (S, G2). When source S transmits an IP packet with the source address of source S and the group address G2, the IP packet is forwarded and replicated by transit routers 1 and 2 along the established path of the MDT to reach egress routers 4 and 5.

Multiprotocol Label Switching (MPLS) multicast is a MPLS-specific version of multicast networking, where multicast forwarding is based on MPLS labels. MPLS MDTs are set up by control protocols such as Point-to-Multipoint-Resource Reservation Protocol (P2MP-RSVP) or multicast Label Distribution Protocol (mLDP).

IP/MPLS multicast is often employed in applications of streaming media, such as IPTV, multi-point video conferencing, or the like. IP/MPLS multicast is "stateful," in the sense that it requires both control plane and data plane states in routers to multicast a packet to specific group address G.

In the example shown in FIG. 1, for example, for MPLS, transit router 2 may maintain states for following flows:
 (S, G1): downstream=5
 (S, G2): downstream=4, 5
 (S, G3): downstream=5

The Bit Index Explicit Replication (BIER) architecture is a "stateless" paradigm for forwarding multicast data packets. BIER does not require a control protocol for explicitly building MDTs, nor does BIER require transit routers to maintain any per-flow state. When a multicast data packet enters the BIER domain, the ingress router (e.g., source S in FIG. 1) determines the set of egress routers to which the packet should be sent. The ingress router then encapsulates the packet in a BIER header. The BIER header includes a BitString in which each bit represents exactly one egress router in the domain. To forward the packet to a given set of egress routers, the specific bits corresponding to those routers are set in the BitString included in the BIER header.

With regard to FIG. 1, for example, when source S intends to multicast a packet for flow (S, G3), the source S adds a BIER header with BitString in which bits 5, 6, 7 are set, assuming that the numeric identifiers of the routers are used as the corresponding bits. The source S then sends the BIER packet to router 1, which is the common shortest path to reach all egress routers corresponding to the set bits in the BitString. Router 1 inspects the BitString and replicates the packet into two copies based on the shortest path to the egress routers. A first of the copies includes BitString with bit 5 set and is sent to router 2. A second of the copies includes a BitString with bits 6 and 7 set and is sent to router 3.

Routers 2 and 3 follow similar procedures to deliver the packet to routers 5, 6 and 7.

Each router in the BIER domain need only maintain the reachability (e.g., shortest path) to possible egress routers in the domain, which is built by BIER control protocols.

An example method for forwarding a packet based on its BIER header is standardized and specified in the BIER Architecture [BIER-ARCH].

A router that supports BIER is known as Bit-Forwarding Router (BFR).

Figure 2:
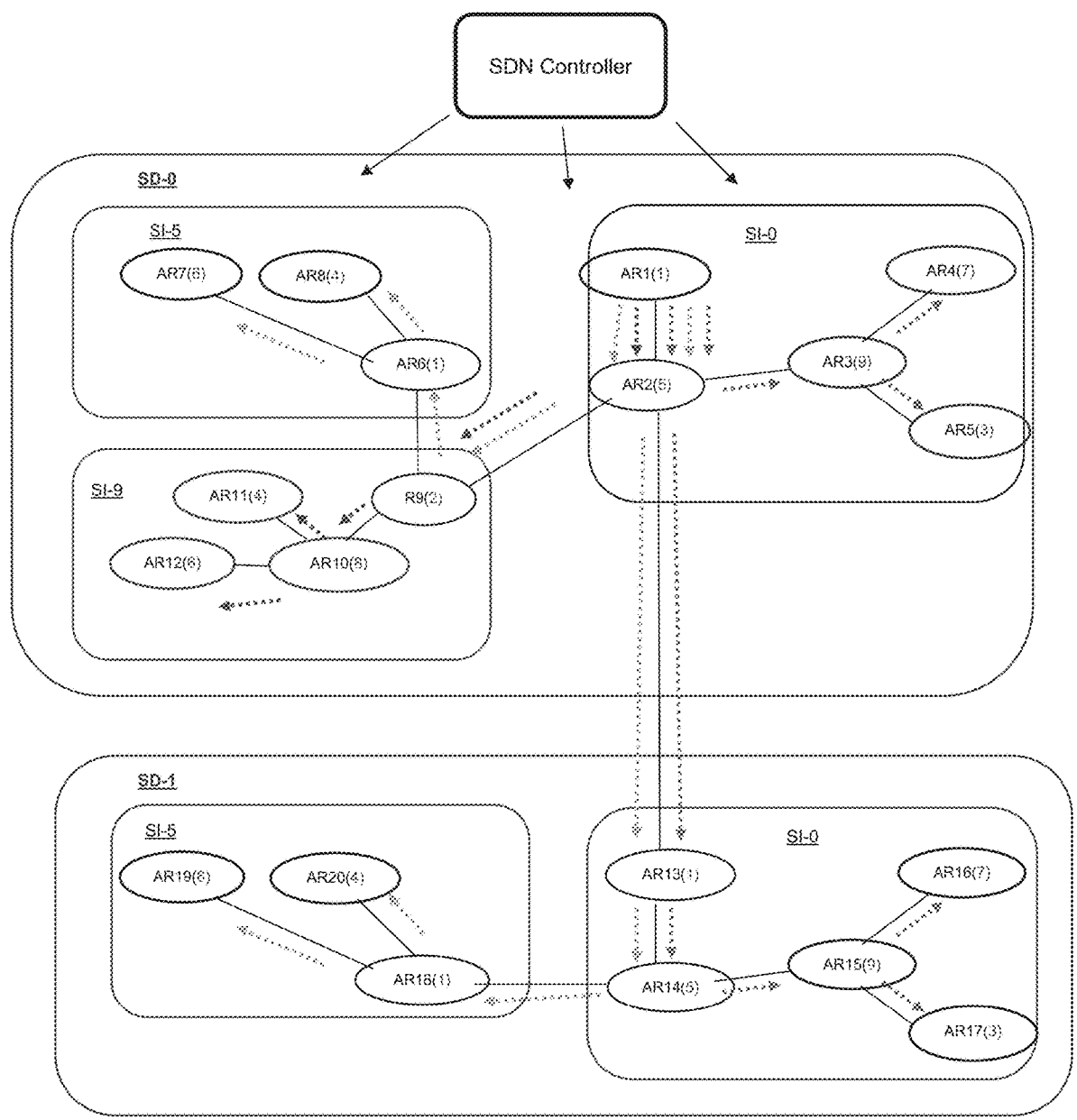
FIG. 2 illustrates an example Bit Index Explicit Replication (BIER) domain including Bit-Forwarding Routers (BFRs).

FIG. 2 illustrates an example BIER domain where all routers AR1 . . . , AR20 are BFRs. A multicast data packet enters a BIER domain at a Bit-Forwarding Ingress Router (BFIR) and leaves the BIER domain at one or more Bit-Forwarding Egress Routers (BFERs). A BFR that receives multicast data packet from another BFR, and forwards the packet to another BFR, is known as a transit BFR.

The example shown in FIG. 2 includes BFIR AR1, BFERs {AR3, AR4, AR5, AR7, AR8, AR10, AR11, AR12, AR15, AR16, AR17, AR19, AR20}, and transit BFRs {AR2, AR6, AR9, AR13, AR14, AR18}. A Software Defined Networking (SDN) controller is also shown in FIG. 2.

A BIER domain is segregated into one or more SubDomains (SDs). Each SD is identified by a SD identifier (SD-id) in the range [0,255]. Each BFR is provisioned with the SD-id to which it belongs.

The BIER domain in FIG. 2 includes two SDs SD-0 and SD-1. SD SD-0 includes BFRs AR1 . . . , AR12. SD SD-1 includes BFRs AR13 . . . , AR20.

A SD may have maximum of 65535 BFRs. Each BFR is assigned a 16-bit BFR identifier (BFR-id) in the range [1,65535]. The BFR-id uniquely identifies a BFR within a SD. The BFR-ids in a SD are allocated "densely" from the numbering space, as this results in more efficient encoding as BitStrings. In one example, if there are 256 or fewer BFERs, then all BFR-ids are assigned from the range [1,256].

Each SD is further segregated into one or more BFR-sets, wherein each BFR-set is uniquely identified by a Set-id (SI).

In the example shown in FIG. 2, the SD SD-0 and SD-1 are segregated into the following BFR-sets:
 SD=0:
 SI-0 including {AR1, AR2, AR3, AR4, AR5}
 SI-5 including {AR6, AR7, AR8}
 SI-9 including {AR9, AR10, AR11, AR12}
 SD=1:
 SI-0 including {AR13, AR14, AR15, AR16, AR17}
 SI-5 including {AR18, AR19, AR20}

In SubDomain SD-0, routers AR1, AR7, AR8, AR10, AR11 and AR12 are BFERs in their respective BFR-sets. In SubDomain SD-1, routers AR15, AR16, AR17, AR19 and AR20 are BFERs in their respective BFR-sets.

The SI is part of the BFR-id, which is composed of SI:BitString. The SI:BitString is calculated as follows:
 If the BFR-id is N, then
  SI is the integer part of the quotient (N−1)/BSL. The parameter "BitStringLength" (BSL) depends on the maximum number of BFRs allowed in a BFR-set, which determines length of the BitString in BIER header. For example, if the maximum number of BFRs allowed in a BFR-set is 256, then BSL=256 bits. Then, a full range of 65,535 BFR-ids would need 256 BFR-sets [i.e., 256 (=BFR sets)×256 (=BSL)=>65,535 BFRs].
 The BitString has one bit position set for the number that uniquely identifies the BFR within the SI. If the low-order bit is denoted as "bit 1" and the high-order bit is denoted as bit "BSL", then the bit position that represents BFR-id N is ((N−1) modulo BitStringLength)+1.

This decomposition is required because the entire BFR-id may not be encoded in the BitString as it would require a BitString of length 65535, which is not a feasible size to be carried in BIER packet. Thus, the BitString is a BIER packet that may address BFERs only within a BFR-set.

Referring back to FIG. 2, for example, a BSL of 256 bits is used across the BIER domain. The BFR-id of AR12 is 2310 (within SD-0), which is composed of SI-9:6 (SI-9 and BitString=the sixth bit). In FIG. 2, bit positions in BitStrings of the routers are shown in parentheses next to the respective router identifier.

If there are 256 or fewer BFRs in a SubDomain, then all BFR-ids may be assigned from one BFR-set (e.g., SI-0), and thus, there is only one BFR-set to manage. In the example shown in FIG. 2, it is assumed that each SubDomain has greater than 4096 BFRs, which results in BFR-sets greater than 16 (~4096/256). For the sake of simplicity, however, only the BFRs of interest {AR1 . . . AR20} are shown in FIG. 2.

In this hierarchical addressing scheme, a BFER is uniquely identified across the BIER domain with the tuple or triple {SD, SI, BitString}. For BFR AR12, for example, this tuple would be {SD-0, SD-9, 6}.

If a BFIR needs to send a packet to a set of BFERs that share the same SubDomain and Set-id {SD, SI}, then all of the BFERs may be represented in a single BitString. The individual BitStrings for all of the BFERs are combined using a bitwise OR operation.

Still referring to the example shown in FIG. 2, assume BFR AR1 wants to multicast packets to BFERs {AR15, AR16, AR17}, which share the same SubDomain and Set-id {SD-1, SI-0}. The individual BitStrings of the BFERs are as follows (it is noted that the actual BSL is 256, but only 10 bits are shown for convenience throughout this disclosure):
BitString of AR15=0100000000
BitString of AR16=0001000000
BitString of AR17=0000000100

In this example, BFR AR1 sends the packet with BIER header containing {SD-1, SI-0} and combined BitString of {0101000100}, which is the BitString for the BFERs AR15, AR16 and AR17.

Thus, a BFIR may multicast to any subset/combination of BFERs "within" a SubDomain and Set-id {SD, SI} by setting the corresponding bits in the BitString.

If a BFIR needs to multicast to BFERs spanning across multiple SubDomains and Set-ids {SD, SI}, then for each SubDomain and Set-id {SD, SI} the BFIR makes a copy of the packet, builds the BitString for BFERs within the SubDomain and Set-id {SD, SI} and sends the copy of the packet with the appropriate tuple {SD, SI, BitString}

In FIG. 2, for the example flow, the BFERs are distributed across 5 unique SubDomain and Set-id combinations {SD, SI}. So, BFR AR1 multicasts 5 copies of the packet, each copy targeting a unique SubDomain and Set-id {SD, SI} as shown below:
{SD-0, SI-0, BFERs=AR3, AR4, AR5}
{SD-0, SI-5, BFERs=AR7, AR8}
{SD-0, SI-9, BFERs=AR10, AR11, AR12}
{SD-1, SI-0, BFERs=AR15, AR16, AR17}
{SD-1, SI-5, BFERs=AR19, AR20}

The tuple {SD, SI, BitString} that uniquely identifies a BFR is not a routable address. Thus, BIER uses existing IP routing methods as an underlay. Each BFR is assigned a BFR-Prefix, which is a routable loopback IP address of the BFR. The mapping of a BFR's BFR-Prefix to the tuple {SD, SI, BitString} is advertised across the BIER domain by the BIER control plane protocols (e.g., Intermediate System-to-Intermediate System (IS-IS), Open Shortest Path First (OSPF), Border Gateway Protocol-Link State (BGP-LS), or the like). In FIG. 2, "ARn" denotes the BFR-Prefix for router ARn (e.g., "AR15" is BFR-Prefix for BFR AR15).

The BIER control protocol at a given BFR maps a BFR-Prefix to a set of one or more equal-cost adjacencies using the Shortest Path First (SPF) algorithm. This results in Bit Index Routing Tables (BIRT) in each BFR, wherein each BIRT contains the reachability information for all BFRs within a SubDomain and Set-id {SD, SI}.

FIGS. 3A through 3E show the five BIRTs for AR2 in FIG. 2. Example embodiments illustrate a BFR-BitString as a key for each row in the BIRT "per-SI-per-SD".

In FIGS. 3A through 3E, the first column shows Bit-Strings of BFRs as a number and BitString (in parentheses) that corresponds to a BitStringLength (BSL) of 10. It is noted that the actual BitStringLength is 256, but the BSLs are shown with length of 10 in the tables for simplicity. The second column is the BFR-Prefixes of BFRs, and the third column is the adjacent/next-hop BFR computed by SPF. The total entries from all BIRTs equals the total number of BFRs in the BIER domain.

The BIER data plane includes Bit Index Forwarding Tables (BIFTs), wherein each BIFT is derived from one BIRT. Thus, there is one BIFT for each SubDomain and Set-id {SD, SI}. BIFTs are indexed and ordered by Bit-Strings of BFRs.

If several rows in the BIRT have the same next-hop, a bit mask that contains bits of all BFRs sharing that next-hop is obtained by taking the bitwise OR of the BitStrings in those rows. This bit mask is called the Forwarding Bit Mask (F-BM), which has significance for optimal forwarding of BIER packets. For example, in FIG. 3A, rows 2, 3, 4 in BIRT-1 have the same next-hop R3. Thus, the F-BM that corresponds to those rows is 0101000100 ("0100000000" OR "0001000000" OR "0000000100").

The BIFT maps from the BitString of a BFER to the corresponding F-BM and next-hop. FIG. 4 shows an example of BIFT-1 that is derived from the BIRT-1 in FIG. 3A.

The BIFTs are programmed into the data plane at each router and are looked up for forwarding BIER packets. Since a BSL of 256 is used here, each of the BIRT and BIFT tables may have up to 256 entries. The total entries from all BIFTs may be equal to the total number of BFRs in the BIER domain.

Figure 5:
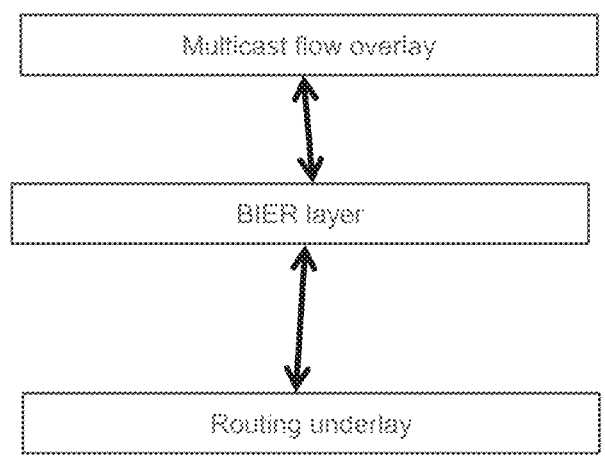
FIG. 5 illustrates an example of a Bit Index Explicit Replication (BIER) framework.

FIG. 5 illustrates an example of a BIER framework.

Referring to FIG. 5, the multicast flow overlay uses the BIER layer for stateless multicast of a packet for a flow. This multicast flow overlay includes the set of protocols and procedures that enable the following functions:
(i) When a BFIR receives a multicast data packet from outside the BIER domain, the BFIR determines the set of BFERs for that packet. This information is provided by the multicast flow overlay.
(ii) When a BFER receives a BIER-encapsulated packet from inside the BIER domain, the BFER determines how to further forward the packet. This information is provided by the multicast flow overlay For example, in the flow shown in FIG. 2, assume the BFIR and the BFERs are Provider Edge (PE) routers providing Multicast Virtual Private Network (MVPN) service. In this example, the multicast flow overlay includes the protocols and procedures between BFIR and all BFERs, wherein the MVPN signaling enables an ingress PE router to determine the set of egress PE routers for a given multicast flow (or set of flows), and also enables the egress PE router to determine the Virtual Routing and Forwarding Tables (VRFs) to which multicast packets from the backbone network should be sent. MVPN signaling also has several components that depend on the type of "tunneling technology" used to carry multicast data through the network. Since BIER is, in effect, a type of "tunneling technology," extensions to the MVPN signaling are used to properly interface the multicast flow overlay with the BIER layer. In the flow shown in FIG. 2, for example, MVPN routes are advertised by a PE router with its BFR-Prefix as the next-hop for MVPN routes. When BFR AR1 wants to multicast to specific MVPN route destination, then BFR AR1 identifies all BFR-Prefixes that would receive the packet. A BFR-Prefix is translated to the tuple {SD, SI, BitString} and the BIER layer is used to multicast the packet.

MVPN is only an example of multicast flow overlay. It is also possible to implement the multicast flow overlay using, for example, a Software-Defined Network (SDN) controller (e.g., as shown in FIG. 2).

Returning to FIG. 5, the routing underlay establishes "adjacencies" between pairs of BFRs and determines one or more "best paths" from a given BFR to a given set of BFRs. At a given BFR (e.g., BFR AR2 in FIG. 2), for every IP address that is the address of a BFR (i.e., the BFR Prefix) in the BIER domain, the routing underlay maps that IP address into a set of one or more "equal-cost" adjacencies. If a BIER data packet is to be forwarded from BFR AR2 to a given BFER (e.g., AR8 in FIG. 2), then the packet follows the path from BFR AR2 to BFER AR8 determined by the routing underlay.

The routing underlay may be the default topology that the Interior Gateway Protocol (IGP) (e.g., OSPF) uses for unicast routing. In this case, the underlay adjacencies are just the OSPF adjacencies. A BIER data packet traveling from BFR AR2 to BFER AR8 will follow the path that OSPF has selected for unicast traffic from BFR AR2 to BFER AR8.

To multicast a packet to a set of BFERs for a flow, a BFIR performs the following steps:
1. Determine the set of BFERs that share the same SubDomain and Set-id {SD, SI}. The number of such sets is N in this example.
2. For each set in N,
    2.1 Determine the BitString that encodes all BFERs in the set and determine the SubDomain and Set-id {SD, SI} which identifies this set.
    2.2 Using information provided by the routing underlay for the SubDomain and Set-id {SD, SI}, determine the next-hop adjacency for each of the destination BFERs in the BitString.
    2.3 Partition the set of destination BFERs such that all BFERs in a single partition have the same next-hop. In this example, the number of partitions is P, and each is associated with a next-hop.
    2.4 For each partition P,
        2.4.1 Make a copy of the packet.
        2.4.2 Clear any bit in the packet's BitString that identifies a BFER that is not in the partition.
        2.4.3 Prepend the BIER header on to the packet. In the BIER header, encode the BitString and encode the SubDomain and Set-id {SD, SI} as a label or by absolute value.
        2.4.4 Transmit the packet to the associated next-hop.

Thus, the BFIR replicates the packet into N×P copies of the packet and transmits each copy with BIER header to designated next-hops. According to at least some example embodiments, N denotes the "Number of Ingress Replications" and P denotes the "Number of Next-hop Replications." It is noted that N is computed by the number of unique SubDomain and Set-id {SD, SI} sets of destination BFERs. An example of this is discussed below with regard to the topology in FIG. 2 for example purposes.

Referring back to the exemplary multicast flow in FIG. 2, if BFIR AR1 intends to multicast a packet to BFERs={AR3, AR5, AR7, AR8, AR10, AR11, AR12, AR15, AR16, AR17, AR19, AR20}, then BFIR AR1 performs the following actions:
1. Segregate the BFERs into the following sets by their SubDomain and Set-id {SD, SI}; in this example the number of SubDomain and Set-id sets N is 5:
    {SD=0, SI=0, BitString=0101000100}
    {SD=0, SI=5, BitString=0000101000}
    {SD=0, SI=9, BitString=0010001000}
    {SD=1, SI=0, BitString=0101000100}
    {SD=1, SI=5, BitString=0000101000}
2. For each of these sets, there is one adjacency next-hop, which is BFR AR2. Thus, the number of partitions P is 1.
3. Create 5 copies of the packet and send each copy with the tuple {SD, SI, BitString} in the BIER header.

FIG. 6 illustrates example encoding of a BIER header, and FIG. 7 illustrates example encoding of a BIER header on an MPLS label stack.

Referring to FIG. 6, the handling and interpretation of the first 4 octets (=BIFT-id+TC+S+TTL) in the BIER header is different depending upon whether the underlying network is an MPLS network or not. The BIFT-id identifies the <SD, SI, BSL> associated with the packet.

In an MPLS network, the first 4 octets of BIER header are also the bottom entry (last 4 octets) of an MPLS label stack. This is illustrated in FIG. 7 as the MPLS packet carries N labels in the stack, where the Nth label is the BIFT-id.

BIFT-id is an MPLS label, which is allocated and advertised by a BFR against a unique <SD, SI, BSL> using BIER control plane protocols such as OSPF, IS-IS, BGP-LS, or the like. Since BIFT-id is an MPLS label, its value may be changed as a BIER packet goes from BFR to BFR.

When a BIER header is encapsulated directly by an Ethernet header (BIFT-id is the only MPLS label), the EtherType is set as MPLS unicast (=0x8847) since for the Ethernet layer this is a unicast packet.

In a non-MPLS network, a domain wide unique BIFT-id is assigned for <SD, SI, BSL>. Such assignment may be done by a centralized SDN controller (e.g., shown in FIG. 2) that oversees the entire BIER domain. If the BIER header is carried as a non-MPLS packet over the Ethernet header, then EtherType is not 0x8847 or 0x8848.

When a BFR receives a BIER packet, the BFR performs the following algorithm:
   S10. Map the BIFT-id in the BIER header to the appropriate SubDomain and Set-id {SD, SI} and obtain the corresponding BIFT.
   S20. If the BitString in BIER header includes all zeroes, then discard the packet and terminate the forwarding process.
   S30. If the BIER header does not include all zeroes, then identify the position (call it "k") of the least significant (the rightmost) bit that is set in the BitString (bits are numbered from 1 starting with least significant bit).
   S40. If bit k identifies the BFR itself, copy the packet, send the copy to the multicast flow overlay, clear the bit k in the original packet, and return to step S20.
   S50. If the bit k does not identify the BFR itself, then use the value k as the "index" to the BIFT.
   S60. Extract the F-BM and the next-hop from the BIFT.

S70. Make a copy of the packet.

S80. Update the BitString of the copy of the packet by AND'ing the "original" BitString with the F-BM, and then forward the copy of the packet to the next-hop. Note that when a packet is forwarded to a next-hop, the BitString of the forwarded packet identifies only those BFERs reachable via that next-hop.

S90. Update the BitString of the original packet by AND'ing the original BitString with the INVERSE of F-BM (basically this clears the bits that identify the BFERs to which a copy of the packet has just been forwarded in step S70).

S100. Return to step S20.

The algorithm performed by the BFR causes a packet to be forwarded to a particular next-hop only once. The number of lookups in the BIFT is the same as the number of next-hops to which the packet must be forwarded (=P=Number of next-hop replications); it is not necessary to do a separate lookup for each destination BFER. Thus, the process provides more optimal forwarding irrespective of the size of the BitString.

A more specific example with regard to BFR AR2 in FIG. 2 will now be described. For the sake of this example, BFR AR2 is assumed to receive a BIER packet with {SD-0, SI-0, 0101000100}.

S11. Based on {SD-0, SI-0}, BFR AR2 determines that BIFT-1 (as shown in FIG. 4) is to be looked up for forwarding the packet.

S12. Since the BitString of the packet is 0101000100, BFR AR2 finds that the first bit in the string is bit 3. Looking at entry 3 in BIFT-1, BFR R2 determines that its F-BM is 0101000100 and that the next-hop is BFR AR3.

S13. BFR AR2 makes a copy of the packet and applies the F-BM to the copy of the packet. The BitString of the copy of the packet is 0101000100=0101000100 AND 0101000100. The copy of the packet is forwarded to BFR AR3 with {SD-1, SI-0, 0101000100}.

S14. BFR AR2 updates the original BitString by applying the inverse of F-BM to the BitString 0101000100. As a result, the original BitString is now 0000000000=0101000100 AND 1010111011. As the resultant BitString is now zero, the forwarding procedure is complete.

In this example, one can see that the number of lookups done in BIFT equals the number of next-hops for BFERs, which equals the number of copies of the packet irrespective of the number of destination BFERs in the BitString.

When a BFER receives a BIER packet, the BFER duplicates the packet and sends the copy to the multicast flow overlay. The procedures performed at the BFER are the same as the steps S10-S40 performed when the BFR receives a BIER packet.

The base specification of BIER as explained above uses hop-by-hop forwarding, wherein each hop makes a forwarding decision based on shortest path to individual routers identified in the BitString. Thus, all flows to the same set of egress routers follow the same path irrespective of quality of service (QoS) requirements of individual flows. A stateful approach with MPLS provides traffic engineered P2MP tunnels with RSVP-TE. BIER provides traffic engineering equivalent to this stateful approach, but with a stateless approach. Currently, there is an ongoing effort in IETF for a high-level BIER Traffic Engineering Architecture [BIER-TE-ARCH], which reuses the base BIER architecture with the following key differences:

BIER-TE replaces the control plane with explicit path computation by an SDN Controller.

In BIER-TE, every position of a bit (BitPosition) of the BitString of a BIER-TE packet indicates one or more adjacencies—instead of a BFER as in BIER.

BIER-TE in each BFR has no BIRT (as no control plane to compute and install SPF based routes to BFERs), but only a TE-BIFT per SubDomain and Set-id {SD, SI}. This TE-BIFT is indexed by bits in BitString. The BitString is populated with only those adjacencies to which the BFR should replicate packets.

Figure 8:
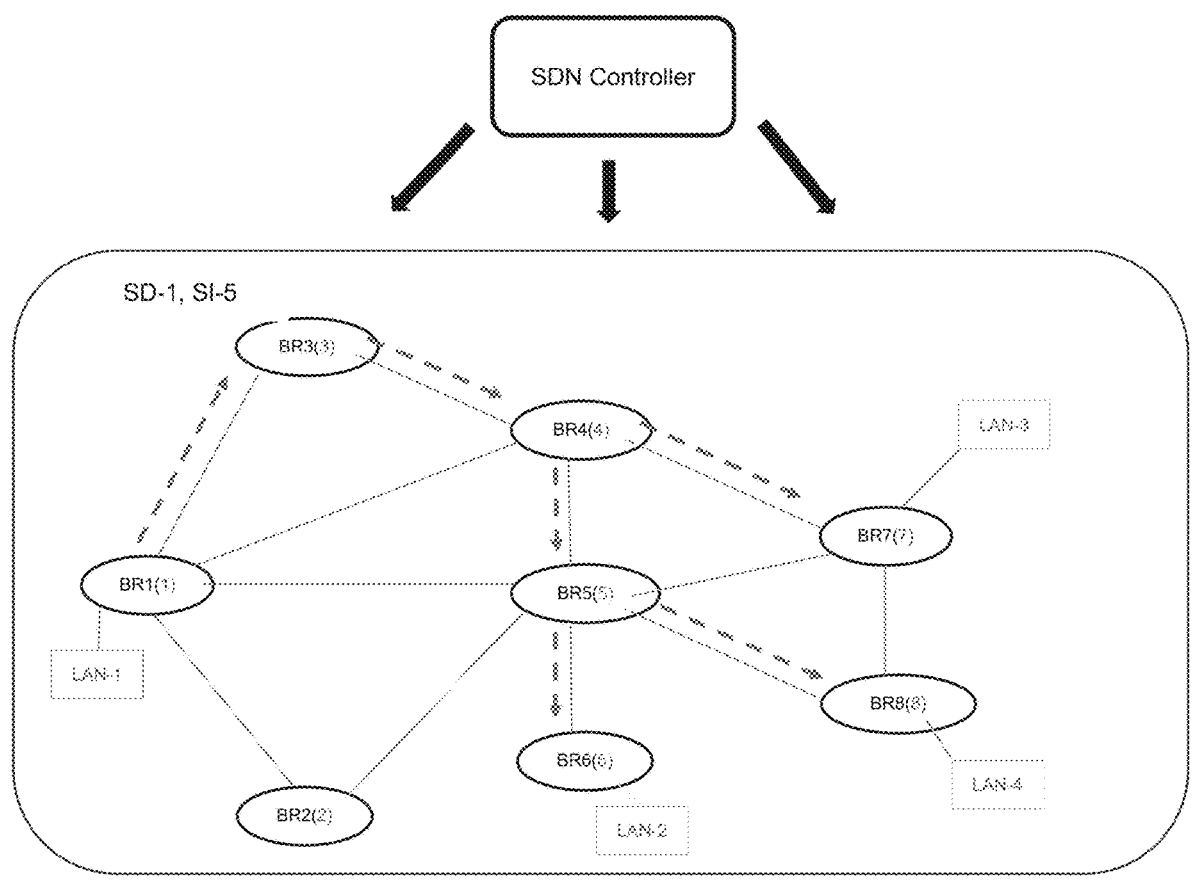
FIG. 8 illustrates a portion of a BIER-Traffic Engineering (BIER-TE) network.

FIG. 8 illustrates a portion of a BIER-TE network.

Referring to FIG. 8, routers BR1-BR8 form the BIER-TE network within the same SubDomain and Set-id {SD-1, SI-5}. The SDN controller assigns bit positions for the following network elements, to identify the respective elements in the BitString in the BIER header.

Each router BR1-BR8 is assigned a globally unique bit position in the BIER BitString, which is equivalent to the BFR-id. Routers BR1-BR8 are assigned bits 1-8 respectively. The SDN controller programs the BIFT in each router with the bit assigned thereto.

Each adjacency between the routers BR1-BR8 is assigned two globally unique bit positions, one for each direction. The following bit positions are assigned to the adjacencies:

BR1→BR3=9, BR3→BR1=10, BR1→BR4=11, BR4→BR1=12,

BR1→BR5=13, BR5→BR1=14, BR1→BR2=15,

BR2→BR1=16, BR3→BR4=17, BR4→BR3=18, BR4→BR5=19,

BR5→BR4=20, BR4→BR7=21, BR7→BR4=22,

BR2→BR5=23, BR5→BR2=24, BR5→BR6=26, BR6→BR5=27,

BR5→BR8=28, BR8→BR5=29, BR5→BR7=30,

BR7→BR5=31, BR7→BR8=32, BR8→BR7=33.

The SDN controller programs the TE-BIFT in a router with bit position for an adjacency, which is "forward connected" (from router to neighbor). For example, for router BR1, the forward connected adjacencies are BR1→BR3, BR1→BR4, BR1→BR5, BR1→BR2 and bit positions for only those adjacencies are programmed into the TE-BIFT in router BR1 for the SubDomain and Set-id {SD-1, SI-5}.

FIG. 9 illustrate an example TE-BIFT programmed by the controller in router BR1 for SubDomain and Set-id {SD-1, SI-5}. The TE-BIFTs for router BR1 is denoted TE-BIFT-1. Note that the F-BM does not have any significance in the BIER-TE since each BitString identifies the unique next-hop. This F-BM has 1:1 correspondence with the BitString.

FIGS. 10A through 10G are example TE-BIFTs programmed for SubDomain and Set-id {SD-1, SI-5} in routers BR2-BR8, respectively. The TE-BIFTs for routers BR2-BR8 are denoted TE-BIFT-2, TE-BIFT-3, TE-BIFT-4, TE-BIFT-5, TE-BIFT-6, TE-BIFT-7 and TE-BIFT-8, respectively. For simplicity, bitwise representation of BitString in the BIFTs is not expanded.

In the example shown in FIG. 8, the source of the example multicast flow is in LAN LAN-1, which is local network of router BR1. Packets for the multicast flow are received by LANs LAN-2, LAN-3 and LAN-4, which are local networks of routers BR6, BR7 and BR8, respectively. Thus, router BR1 is the BFIR and routers BR6-BR8 are BFERs of the multicast flow. If router BR1 intends to send the multicast flow along a traffic engineered explicit path tree, which meets the QoS requirements of the flow, then the explicit path is computed by the SDN controller based on its traffic engineering database (TE-DB) of the network. In this example, it is assumed that the explicit path for the exemplary multicast flow includes the forward connected adjacencies {BR1→BR3, BR3→BR4, BR4→BR5, BR4→BR7, BR5→BR6, BR5→BR8}.

For any packet for the flow received from LAN LAN-1, router BR1 adds a BIER header with a BitString identifying the bits of all forward connected adjacencies in the explicit path tree and the BFERs; that is, for example, BitString=bits of {BR1→BR3, BR3→BR4, BR4→BR5, BR4→BR7, BR5→BR6, BR5→BR8, BR6, BR7, BR8}. For simplicity, in this example the BitString is not described with bit wise representation, but by the mnemonics of respective forward connected adjacencies and BFERs.

In the BitString, BR1→BR3 is the only forward connected adjacency of router BR1, so router BR1 would reset the bit for BR1→BR3 and send the packet over BR1→BR3 with BitString including bits of {BR3→BR4, BR4→BR5, BR4→BR7, BR5→BR6, BR5→BR8, BR6, BR7, BR8}.

Any receiver that receives the BitString makes a copy of the packet to each forward connected adjacency of that receiver, resets the bits for those adjacencies and sends out the remaining bits in the copies. In this example, router BR3 receives the packet with BitString including bits of {BR3→BR4, BR4→BR5, BR4→BR7, BR5→BR6, BR5→BR8, BR6, BR7, BR8}. Router BR3 identifies BR3→BR4 as the only forward connected adjacency of router BR3, resets the bit for BR3→BR4, and sends the packet over BR3→BR4 with BitString including bits of {BR4→BR5, BR4→BR7, BR5→BR6, BR5→BR8, BR6, BR7, BR8}.

Router BR4 receives the BitString including bits of {BR4→BR5, BR4→BR7, BR5→BR6, BR5→BR8, BR6, BR7, BR8} and identifies the two forward connected adjacencies (BR4→BR5 and BR4→BR7). So router BR4 resets those two bits and sends one copy each to BR4→BR5 and BR4→BR7 with BitString including {BR5→BR6, BR5→BR8, BR6, BR7, BR8}.

When router BR7 receives the packet with BitString including {BR5→BR6, BR5→BR8, BR6, BR7, BR8}, the router BR7 identifies only the local BFR-id of the router BR7 itself, so the router BR7 strips the BIER header from the packet and delivers the payload to the multicast flow overlay.

When router BR5 receives the packet with BitString including {BR5→BR6, BR5→BR8, BR6, BR7, BR8}. Thus, router BR5 identifies the two forward connected adjacencies BR5→BR6 and BR5→BR8. So, router BR5 resets those two bits and sends one copy to each of BR5→BR6 and BR5→BR8 with BitString including {BR6, BR7, BR8}.

When router BR6 receives the packet with BitString including {BR6, BR7, BR8}, router BR6 identifies only the local BFR-id of the router BR6 itself, and the router BR6 strips the BIER header from the packet and delivers the payload to the multicast flow overlay.

When router BR7 receives the packet with BitString including {BR6, BR7, BR8}, the router BR7 identifies only the local BFR-id of router BR7 itself. As a result, router BR7 strips the BIER header from the packet and delivers the payload to the multicast flow overlay.

BIER-TE forwarding procedures in a transit BFR are similar to BIER as described above, except that few steps are omitted. Example BIER-TE transit BFR procedures are discussed below.

S21. The transit BFR maps the BIFT-id in the BIER header to the appropriate SubDomain and Set-id {SD, SI} and obtains the corresponding TE-BIFT for BIER-TE.

S22. If the BitString in the BIER header includes all zeroes, then the packet is discarded and the forwarding process terminates.

S23. If the BitString in the BIER header does not include all zeroes, then the transit BFR finds the position (call it "k") of the least significant (the rightmost) bit that is set in the BitString (bits are numbered from 1, starting with least significant bit).

S24. If bit k identifies the transit BFR itself, then the transit BFR copies the packet, sends the copy to the multicast flow overlay, clears k bit in the original packet, and returns to step S22.

S25. The transit BFR uses the value k as the "index" to the BIFT. If the F-BM is empty, then the transit BFR determines that there is no known adjacency, and the process returns to step S23 for the next bit in the BitString.

S26. The transit BFR then extracts the next-hop from the BIFT.

S27. The transit BFR then copies the packet.

S28. The process then returns to step S22.

In BIER-TE, the number of lookups in the TE-BIFT is always the same as number of bits in the BitString. This is different from BIER, wherein the number of lookups in the BIFT is same as the number of next-hops to which the packet is forwarded. Thus, the latency of BIER-TE packets at a BFR grows linearly with the number of bits in the BitString.

Conventional BIER-TE is within the scope of a specific SubDomain and Set-id {SD, SI} only and cannot span across multiple SubDomain and Set-id sets. This is because the entire explicit path multicast tree (all links/adjacencies and egress routers) is encoded in a single BitString and the BitString is specific to a single SubDomain and Set-id {SD, SI} only. As a result, the size of a conventional BIER-TE network is limited.

Scalability of conventional BIER-TE is also limited due to the linear dependency of the number of links/adjacencies in the network on the length of the BitString. Each adjacency between routers is assigned two globally unique bit positions for the BitString. Thus, the maximum number of adjacencies possible MAX_ADJ in a conventional BIER-TE network is $$\text{MAX}_{ADJ} = \frac{\text{L\_BitString} - \text{MAX\_NUM\_BFR}}{2},$$

where L_BitString is the length of the BitString and the MAX_NUM_BFR is the maximum number of BFRs in the network. This is not practical. Typically, BIER uses the BitString length of 256 bits for a specific SubDomain and Set-id {SD, SI}. That means that conventional BIER-TE must manage the 256 bits to accommodate the bits to identify each direction of each adjacency and each BFR within the SubDomain and Set-id {SD, SI}. Typically, an existing stateful multicast deployment (e.g., P2MP MPLS-TE with RSVP-TE) contains thousands of adjacencies and hundreds of routers. Although conventional BIER-TE also allows a BitString length of up to 4096 bits, it is relatively impractical because: the ~128B overhead imposed by the BIER header is significant; a single router of high port density may have ~500 forwarding adjacencies, which makes even 4096 bits impractical; and conventional BIER-TE requires lookup of each bit in the BitString in the TE-BIFT since F-BM has no role due to 1:1 mapping between bits to next-hops.

A BitString also contains bits that are irrelevant to a transit-BFR since it also receives the bits for adjacencies, which are not forward connected to the transit BFR. This further worsens the impracticability of conventional BIER.

Conventional BIER-TE mandates a SDN controller for assignment of globally unique bit positions for adjacencies and to compute the explicit path multicast tree for a multicast flow. This may make conventional BIER-TE impractical in service provider networks that does not employ a SDN controller.

One or more example embodiments provide a solution that may be deployed with wider scope, unlimited scalability and may be a more ideal replacement for existing P2MP MPLS-TE deployments in service provider networks.

One or more example embodiments introduce a novel architecture for BIER-TE. The architecture according to one or more example embodiments is scalable and may replace conventional P2MP MPLS-TE deployments. At least some example embodiments combine BIER with stateful unicast MPLS-TE tunneling, which is setup by RSVP-TE signaling, to achieve a scalable BIER-TE architecture. Unicast MPLS-TE tunnels are used as an underlay of the BIER layer.

Figure 11:
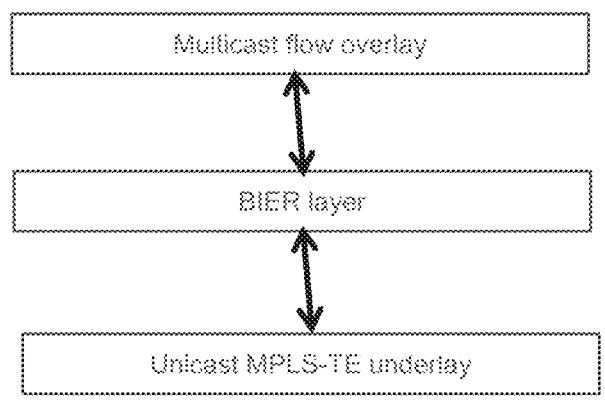
FIG. 11 illustrates a framework according to one or more example embodiments.

FIG. 11 illustrates a framework according to one or more example embodiments. As shown in FIG. 11, the multicast flow overlay uses the BIER layer, and the unicast MPLS-TE tunnels are used as the underlay of the BIER layer.

Figure 12:
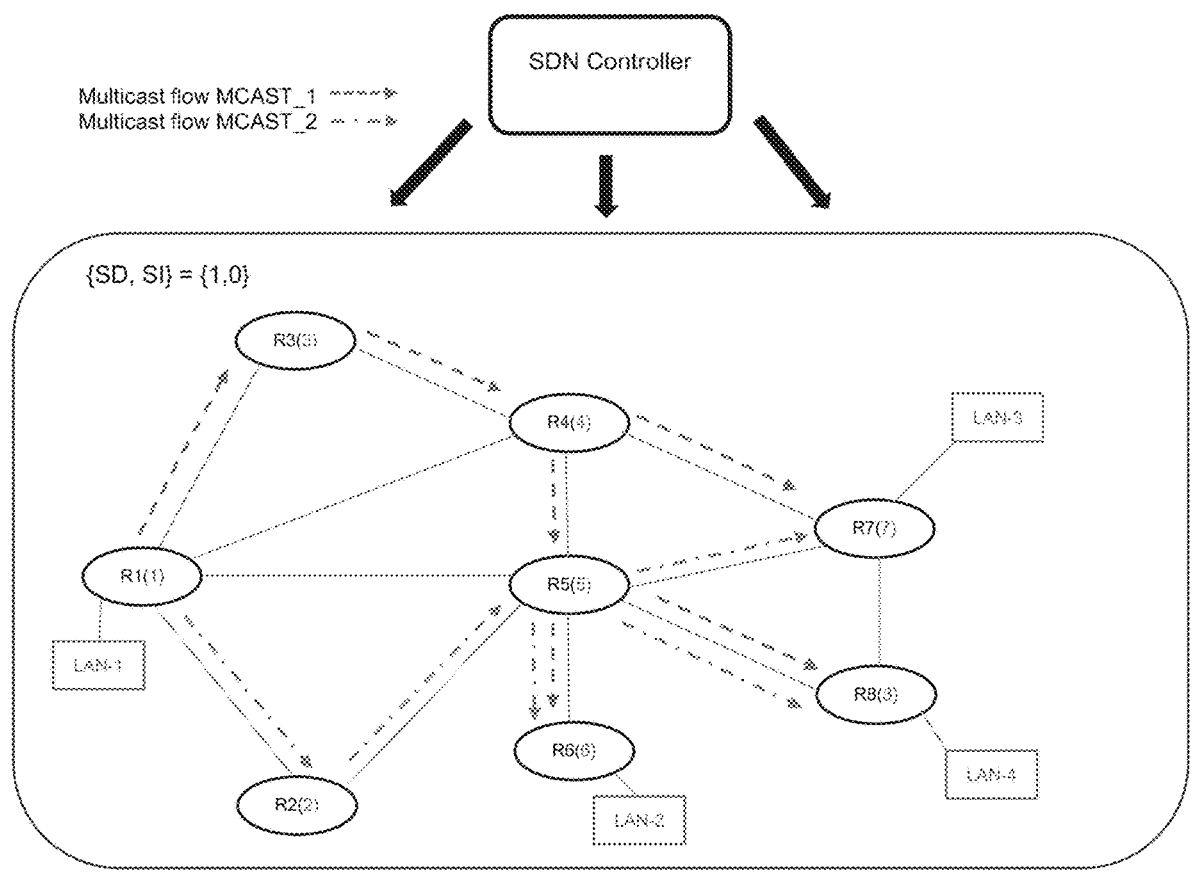
FIG. 12 illustrates a network topology according to an example embodiment.

FIG. 12 illustrates a network topology according to an example embodiment.

The topology shown in FIG. 12 has several unicast MPLS-TE tunnels from ingress router R1 (BFIR) to egress routers (BFERs) R6, R7, R8, which are set-up using RSVP-TE as the signaling protocol. A description of an example of how the MPLS-TE tunnels are setup will now be provided.

Links are assigned various Traffic Engineering (TE) metrics such as available bandwidth, delay, etc. The TE metrics of the links are flooded across the network using the IGPs such as IS-IS, OSPF, etc., from which each router builds its own TE Database (TEDB).

A tunnel to an egress router (BFER) is initiated by the source, which is router R1 (a BFIR) in the example shown in FIG. 12.

At router R1, a MPLS-TE tunnel (or tunnel) to an egress router is assigned a specific set of QoS requirements such as bandwidth, delay, etc., and the router R1 computes a Constraint Shortest Path First (CSPF) based on its TEDB to find an explicit path that meets the QoS of the tunnel. Optionally, the explicit path computation may be also performed by a centralized external agent such as a Path Computation Element (PCE) Server, wherein the PCE server receives updates on TE metrics of the links in the network and builds its own TE-DB. In SDN, the PCE server may be a component of SDN controller. Once an explicit path is computed, the router R1 sets up the tunnel along the path by using RSVP-TE. The state of a tunnel is maintained by RSVP-TE across each router along its explicit path. RSVP-TE uses the tuple {source router's IP address, destination router's IP address, tunnelID} as the globally unique identifier of a tunnel and its states across the network. The tunnelID space is specific to the source router. RSVP-TE messages also include the QoS attributes of the tunnel based on which the TE metrics on the links along the path are updated. For example, if the available bandwidth on a traversed link is 100 Mbps before the tunnel is set up, and the bandwidth consumed by the tunnel is 20 Mbps, then the available bandwidth on the link after the tunnel is set up is updated to 100−20=80 Mbps. The updated TE metrics are then flooded by the IGPs, which is reflected in the TEDB of respective routers. For simplicity, bandwidth may be used as the sole QoS/TE metric in the examples discussed herein. However, example embodiments should not be limited to this example.

There may be multiple tunnels from router R1 to an egress router, each tunnel following a different explicit path and providing varying degrees of QoS/TE requirements (e.g., bandwidth, delay, cost, etc.).

An example list of active MPLS-TE tunnels in FIG. 12 is shown in Tables 1-3 below. The identifier of a tunnel is denoted as LSP_X_Y_N, wherein X=source IP address, Y=destination IP address, N=tunnelID allocated by source. Further, the source and destination IP address is denoted by the name of the source and destination routers respectively; that is, for example, R1 is the IP address of router R1, etc.

TABLE 1

R1 to R6

| Identifier | Path | Signaled BW | Allocated BW | Residual BW |
|---|---|---|---|---|
| LSP_R1_R6_1 | R1→R3→R4→R5→R6 | 100 | 20 | 80 |
| LSP_R1_R6_2 | R1→R2→R5→R6 | 20 | 10 | 10 |
| LSP_R1_R6_3 | R1→R5→R6 | 60 | 40 | 20 |

TABLE 2

R1 to R7

| Identifier | Path | Signaled BW | Allocated BW | Residual BW |
|---|---|---|---|---|
| LSP_R1_R7_4 | R1→R3→R4→R7 | 80 | 20 | 60 |
| LSP_R1_R7_5 | R1→R5→R7 | 50 | 30 | 20 |
| LSP_R1_R7_6 | R1→R2→R5→R7 | 70 | 40 | 30 |

TABLE 3

R1 to R8

| Identifier | Path | Signaled BW | Allocated BW | Residual BW |
|---|---|---|---|---|
| LSP_R1_R8_7 | R1→R3→R4→R5→R8 | 90 | 40 | 50 |
| LSP_R1_R8_8 | R1→R4→R5→R8 | 20 | 10 | 10 |
| LSP_R1_R8_9 | R1→R2→R5→R8 | 40 | 10 | 30 |

These tunnels are used to carry unicast traffic from router R1 to routers R6-R8 for various applications. At router R1, which is the source of the tunnel, the individual applications that use the tunnel further reserve TE resources from the tunnel.

Assume tunnel LSP_R1_R6_1 is set up with bandwidth 100 Mbps, which is termed as "Signaled BW" of the tunnel across its path, with two applications currently using this tunnel to send unicast traffic from router R1 to router R6 (APP_R1_1 using bandwidth 11 Mbps and APP_R1_2 using bandwidth 9 Mbps). In this example, at router R1, the total "Allocated BW" of the tunnel is 20 Mbps and the "Residual BW" (unallocated bandwidth) of the tunnel is 80 Mbps.

To enable BIER-TE in the network, each of the routers R1-R8 that participate in BIER-TE are assigned a globally unique tuple {SD, SI, BitString} in the same or substantially the same way as described above. Thus, the routers R1-R8 become BFRs. The tuple may be manually configured on each router by a network operator or may be configured through the SDN controller, if the network deploys such a controller.

In FIG. 12, for simplicity all routers R1-R8 are within the same SubDomain and Set-id {1,0}. If the allocated BitString for routers R1-R8 are bits 1-8, respectively, then a router uses the loopback address used as source or destination IP address for MPLS-TE tunnels as the BFR-Prefix. The mappings of BFR-Prefix→{SD, SI, BitString} of routers are distributed across the network by the BIER control plane (e.g., IGPs) as described above. Accordingly, each router builds an identical database of all BFR-Prefixes in the network.

According to one or more example embodiments, the configuration of BIER-TE in a router involves enabling a set of MPLS-TE tunnels for BIER-TE. The set of MPLS-TE tunnels may be all MPLS-TE tunnels traversing the router or a subset of all MPLS-TE tunnels traversing the router.

Figure 15:
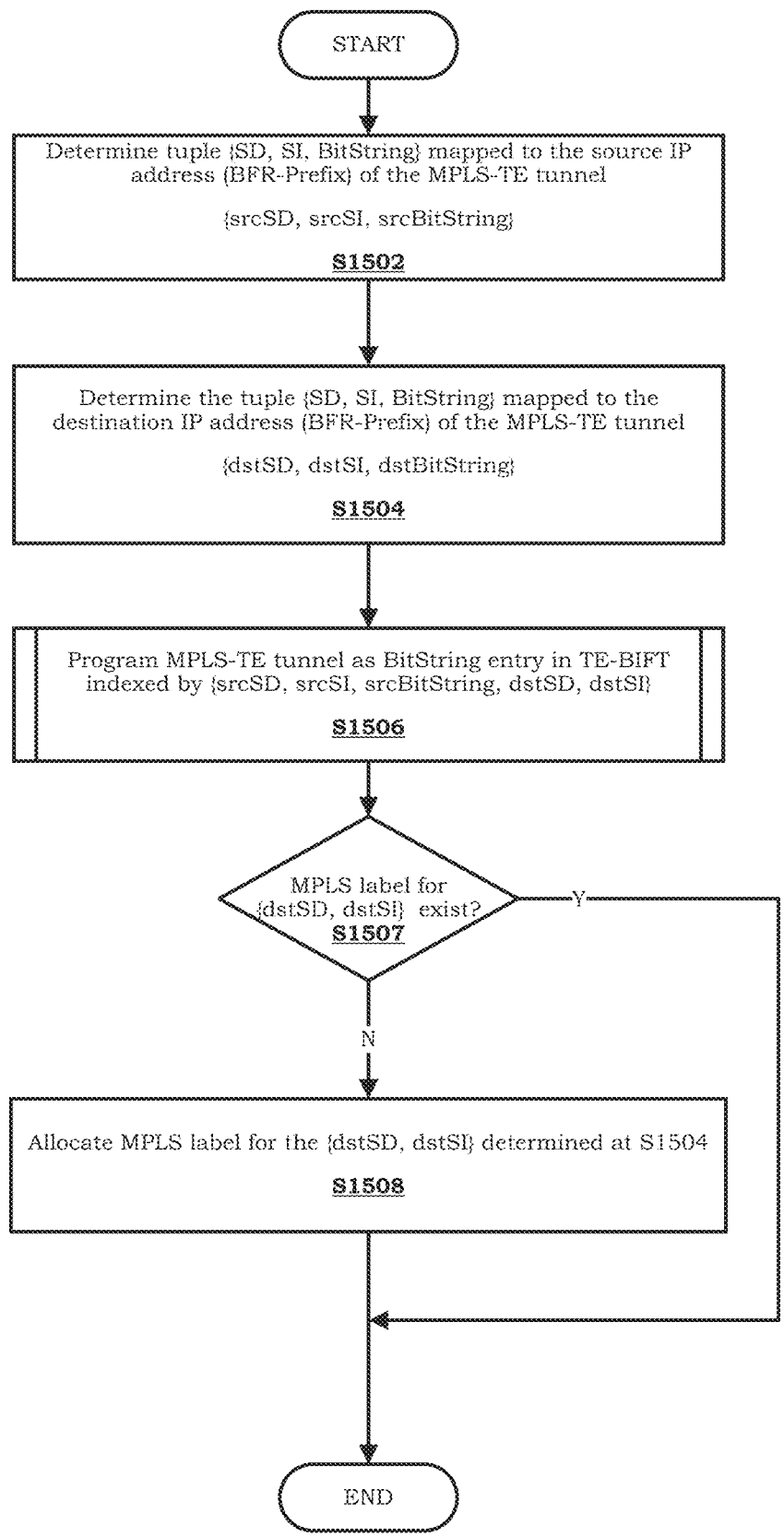
FIG. 15 is a flow chart illustrating a method according to example embodiments.

FIG. 15 is a flow chart illustrating a method for configuring a router to participate in BIER-TE according to example embodiments. The method shown in FIG. 15 will be discussed with regard to router R3 for example purposes. However, the method shown in FIG. 15 may be performed at each router in FIG. 12 to enable BIER-TE in the network or network segment. The method shown in FIG. 15 will also be discussed with regard to an MPLS-TE tunnel in a set or subset of MPLS-TE tunnels. However, it should be understood that the method shown in FIG. 15 may be performed for each tunnel in the set or subset of MPLS-TE tunnels.

Referring to FIG. 15, at step S1502 the router R3 determines the tuple {SD, SI, BitString} mapped to the source IP address (BFR-Prefix) of the MPLS-TE tunnel. This is denoted as {srcSD, srcSI, srcBitString} (sometimes referred to as source or ingress router identification information), which uniquely identifies the source of the MPLS-TE tunnel. In the example shown in FIG. 12, the tuple {srcSD, srcSI, srcBitString} identifies BFIR R1.

At step S1504, the router R3 determines the {SD, SI, BitString} mapped to the destination IP address (BFR-Prefix) of the MPLS-TE tunnel. This is denoted as {dstSD, dstSI, dstBitString} (sometimes referred to as destination or egress router identification information). In the example shown in FIG. 12, {dstSD, dstSI, dstBitString} may identify routers R6, R7 or R8.

At step S1506, the router R3 programs the MPLS-TE tunnel as a BitString entry in a TE-BIFT indexed by {srcSD, srcSI, srcBitString, dstSD, dstSI}. According to one or more example embodiments, {srcSD, srcSI, srcBitString, dstSD, dstSI} may also be referred to as source identification information and a portion of the destination identification information. Thus, there is one TE-BIFT for the MPLS-TE tunnels from a BFIR to various BFERs within a specific destination SubDomain and Set-id {dstSD, dstSI}. The indexing of the TE-BIFT differs from conventional BIER, wherein the BIFT is indexed by only the destination SubDomain and Set-id {dstSD, dstSI}.

Figure 16:
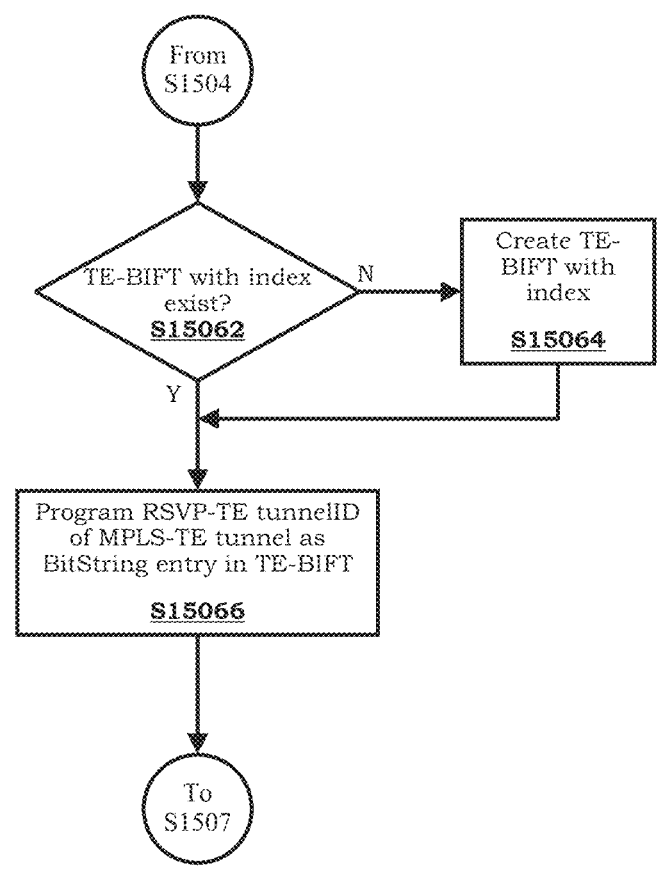
FIG. 16 is a flow chart illustrating a method according to example embodiments.

FIG. 16 is a flow chart illustrating a method of programming an MPLS-TE tunnel into a TE-BIFT as a BitString entry (step S1506) according to example embodiments. As with the example embodiment shown in FIG. 15, the method shown in FIG. 16 will be discussed with regard to router R3 in FIG. 12.

Referring to FIG. 16, at step S15062, the router R3 examines the TE-BIFTs at the router R3 to determine whether a TE-BIFT having an index including the tuple {srcSD, srcSI, srcBitString, dstSD, dstSI} exists.

If the router R3 determines that a TE-BIFT having the index {srcSD, srcSI, srcBitString, dstSD, dstSI} does not exist, then the router R3 creates the TE-BIFT having the index {srcSD, srcSI, srcBitString, dstSD, dstSI} at step S15064.

At step S15066, the router R3 then programs and/or enters the RSVP-TE tunnelID of the MPLS-TE tunnel as a BitString entry into the TE-BIFT having the index {srcSD, srcSI, srcBitString, dstSD, dstSI}. In this case, the tunnelID is used as a bit position in the BitString. The next-hop of this BitString entry is the next-hop of the MPLS-TE tunnel. Essentially, all MPLS-TE tunnels from that source router to various destination routers in the destination SubDomain and Set-id {dstSD, dstSI} are identified as bits in the BitString for this TE-BIFT.

Returning to step S15062, if the router R3 determines that the TE-BIFT having the index {srcSD, srcSI, srcBitString, dstSD, dstSI} exists, then the process proceeds to step S15066 and continues as discussed above.

Returning to FIG. 15, once the MPLS-TE tunnel is programmed into the TE-BIFT, at step S1507 the router R3 checks whether a MPLS label for the destination SubDomain and Set-id {dstSD, dstSI} has been already allocated for another MPLS-TE tunnel, which has been already installed for BIER-TE.

If a MPLS label has not yet been allocated for the destination SubDomain and Set-id {dstSD, dstSI}, then at step S1508 the router R3 allocates a unique MPLS label for the destination SubDomain and Set-id {dstSD, dstSI} determined at step S1504. This MPLS label is encoded in a BIFT-id field in the BIER header to identify BIER-TE packets sent to this router for the destination SubDomain and Set-id {dstSD, dstSI}. The MPLS label is advertised across the network by the BIER control plane.

Returning to step S1507, if a MPLS label has already been allocated for the destination SubDomain and Set-id {dstSD, dstSI}, then the process terminates.

According to one or more example embodiments, the methods shown in FIGS. 15 and 16 may be performed at each router as necessary such that each router allocates an MPLS label for each unique destination SubDomain and Set-id {dstSD, dstSI} associated with its TE-BIFTs.

Referring back to FIG. 12, the BFIR R1 and BFERs R6, R7, and R8 are located in the same SubDomain and Set-id {1, 0}. Since router R1 is the only BFIR, each BFR in the path of MPLS-TE tunnel(s) will create only one TE-BIFT, which is indexed by {srcSD=1, srcSI=0, srcBitString=1, dstSD=1, dstSI=0}. When BFERs span across multiple sets of destination SubDomain and Set-id {dstSD, dstSI}, then the BFIR sends a copy of BIER-TE packet for each destination SubDomain and Set-id {dstSD, dstSI} with the BitString including the MPLS-TE tunnels within that destination SubDomain and Set-id {dstSD, dstSI}.

FIGS. 13A through 13H illustrate example TE-BIFTs in routers R1-R8 for the index {srcSD=1, srcSI=0, srcBitString=1, dstSD=1, dstSD=0}.

In describing the example embodiments shown in FIGS. 12 and 13A-13H, we consider a multicast flow MCAST_1 originated from LAN LAN-1 with the receivers located in LANs LAN-2, LAN-3, LAN-4. In this example, router R1 is the BFIR and routers R6-R8 are BFERs for the multicast flow MCAST_1. It is assumed that the multicast flow MCAST_1 requires a bandwidth of 40 Mpbs, and thus, router R1 selects one MPLS-TE tunnel to each of routers R6-R8 that meets the bandwidth criteria (i.e., the MPLS-TE tunnel has residual bandwidth ≥40 Mbps). For the purposes of this example, the selected tunnels to routers R6-R8 are determined to be LSP_R1_R6_1, LSP_R1_R7_4, LSP_R1_R8_7 (see Tables 1-3 above), respectively. Router R1 accordingly adjusts the allocated and residual bandwidth of the three tunnels by 40 Mbps.

For each packet for multicast flow MCAST_1, router R1 adds a BIER header with {type=BIER-TE, srcSD=1, srcSI=0, srcBitString=1, BitString=0x0001001001, dstSD=1, dstSI=0}. The router R1 then forwards the BIER-TE packet by looking up the BitString in TE-BIFT-R1 (FIG. 13A), which is indexed by {srcSD=1, srcSI=0, srcBitString=1, dstSD=1, dstSD=0}. This forwarding procedure is similar to BFIR procedures described above. All bits in the BitString share the common next-hop R1→R3, so a lookup based on the first bit determines the common next-hop R1→R3 for the entire BitString. This determination is based on the F-BM 0x0001001001 associated with the first entry in TE-BIFT-R1, which is the entire BitString. Thus, the number of look ups in TE-BIFT to forward a BIER-TE packet is equal to the number of next-hops associated with the BitString, irrespective of the length of the BitString. The router R1 then forwards the BIER-TE packet to router R3 on the link R1→R3.

When router R3 receives the BIER-TE packet with {type=BIER-TE, srcSD=1, srcSI=0, srcBitString=1, BitString=0x0001001001, dstSD=1, dstSI=0}, the router R3 makes forwarding decision by looking up the BitString in TE-BIFT-R3 (FIG. 13C), which is indexed by {srcSD=1, srcSI=0, srcBitString=1, dstSD=1, dstSI=0}, in a manner similar to the BFIR procedures described above. All the bits in the BitString share the common next-hop R3→R4, so a lookup based on the first bit determines the next-hop for the entire BitString. The F-BM associated with the first entry in TE-BIFT-R3 is 0x0001001001, which is the entire BitString received in the BIER-TE packet, The router R3 then forwards the BIER-TE packet to router R4 on the link R3→R4.

When router R4 receives the BIER-TE packet with {type=BIER-TE, srcSD=1, srcSI=0, srcBitString=1, BitString=0x0001001001, dstSD=1, dstSI=0}, the router R4 makes a forwarding decision by looking up the BitString in TE-BIFT-R4 (FIG. 13D), which is indexed by {srcSD=1, srcSI=0, srcBitString=1, dstSD=1, dstSI=0}, in a manner similar to the transit-BFR procedures discussed above. The decision results in segregation of the BitString into the following two subset BitStrings:

BitString={0x0001000001} on R4→R5 after the lookup of first bit.

BitString={0x0000001000} on R4→R7 after the lookup of fourth bit.

Router R4 then makes the following two copies of the packet and forwards the copies to routers R5 and R7 on the respective links.

Copy-1={type=BIER-TE, srcSD=1, srcSI=0, srcBitString=1, BitString=0x0001000001, dstSD=1, dstSI=0} on link R4→R5

Copy-2={type=BIER-TE, srcSD=1, srcSI=0, srcBitString=1, BitString=0x0000001000, dstSD=1, dstSI=0} on link R4→R7

When router R7 receives Copy-2, the router R7 looks to TE-BIFT-R7 (FIG. 13G) based on {srcSD=1, srcSI=0, srcBitString=1, dstSD=1, dstSI=0}. The only bit in the BitString identifies router R7 as the local router, and thus, router R7 strips the BIER header and delivers the packet to the multicast flow overlay.

When router R5 receives Copy-1, the router R5 looks to TE-BIFT-R5 (FIG. 13E) based on {srcSD=1, srcSI=0, srcBitString=1, dstSD=1, dstSI=0}. Using procedures similar to that discussed above with regard to router R4, router R5 makes the following two copies of the packet and forwards the packets to routers R6 and R8 on respective links as shown below.

Copy-3={type=BIER-TE, srcSD=1, srcSI=0, srcBitString=1, BitString=0x0001000000, dstSD=1, dstSI=0} on link R5→R8

Copy-4={type=BIER-TE, srcSD=1, srcSI=0, srcBitString=1, BitString=0x0000000001, dstSD=1, dstSI=0} on link R5→R6

Router R8 and Router R6 process Copy-3 and Copy-4, respectively, in the same or substantially the same manner as discussed above with regard to router R7. As a result, the egress routers R6-R8 receive a copy of the packet sent from router R1.

For simplicity, the example described immediately above assumes a P2MP multicast flow from router R1 to routers R6-R8. In real deployments, however, there may be mesh of MPLS-TE tunnels among all routers that participate in multicast. So, any router may send stateless BIER-TE multicast packets to any subset of the participating routers using the appropriate MPLS-TE tunnels among them.

According to at least one example embodiment, packet processing procedures at the BFIR, transit-BFR and BFER may be similar to conventional BIER, except that the BIER header includes additional encoding to indicate the packet is a BIER-TE packet. Example embodiments may co-exist with conventional BIER.

The total number of entries across all TE-BIFTs in a router grow linearly with the number of MPLS-TE tunnels traversing the router, which can be generalized to a number of MPLS-TE tunnels in the network. For example, if the network has N number of BFERs and there are M number of MPLS-TE tunnels (each direction) between a pair of BFERs, then the total entries in a router across all TE-BIFTs is 2×N×M.

By default, example embodiments should not require any changes in RSVP-TE. However, optional capabilities may be added in RSVP-TE signaling procedures as discussed in more detail later.

By default, all MPLS-TE tunnels traversing a router are programmed into the TE-BIFT of that router. So, a BFR is free to consider any MPLS-TE tunnel originated from the BFIR as underlay for BIER-TE. However, a BFIR may want to include only a specific subset of tunnels as underlay for BIER-TE. In that case, transit-BFRs or BFERs may program only the included subset of tunnels in the TE-BIFT. To indicate the inclusion of a tunnel for BIER-TE, the BFIR may add an OPTIONAL BIER-TE Capability (BIER-TE capability attribute) in RSVP-TE signaling messages (e.g., RSVP-TE path messages) for the tunnel. In at least one example embodiment, the bit string entry for an MPLS-TE tunnel may be generated and programmed into TE-BIFT in response to (e.g., only if) a BIER-TE capability attribute received in the RSVP-TE path message for the MPLS-TE tunnel. The BIER-TE capability attribute in RSVP-TE path messages for an MPLS-TE tunnel may indicate the inclusion of the MPLS-TE tunnel for BIER-TE to all traversed routers.

As described in the example in FIG. 12, the RSVP-TE tunnelID is used as a bit position in BitString of BIER-TE packets. For example, if the BitString used in BIER-TE network is of length 256-bits, then the MPLS-TE tunnels included for BIER-TE must be in the tunnelID space [1, 256]. To decouple this constraint from tunnelID space, a BFIR may add an OPTIONAL BIER-TE BitString attribute (BIER-TE bit string attribute) in RSVP-TE signaling messages (e.g., RSVP-TE path messages) to indicate the bit position for a tunnel to all traversed routers. When this option is present, all BFRs along the tunnel path may use the BitString attribute instead of the tunnelID. Thus, according to one or more example embodiments, the BitString may be based on a BIER-TE bit string attribute received in the RSVP-TE path message for the MPLS-TE tunnel.

Example encoding and operational procedures of the OPTIONAL BIER-TE Capability and the BIER-TE Bit-String attribute in RSVP-TE signalling messages will now be discussed in more detail.

A RSVP-TE message (e.g., Path or Resv Message) carries several "Objects", each Object carrying a set of parameters or characteristics of a MPLS-TE tunnel. Some Objects are MANDATORY, whereas others are OPTIONAL. An Object is encoded with the common header containing the fields Length, Class-Num and C-Type, which is followed by Object specific contents. The Class-Num represents a class of Objects to which the Object belongs, and C-type defines the Object within the Class-Num. The tuple {Class-Num, C-Type} uniquely identifies an Object.

The contents of an Object may contain several TLVs (Type, Length, Value encoded information). For the OPTIONAL BIER-TE Capability and the BIER-TE Bit-String attribute, according to one or more example embodiments, existing Objects and TLVs such as Attribute TLVs, Label Switched Path (LSP)_ATTRIBUTES Objects, and LSP_REQUIRED_ATTRIBUTES Objects may be relevant.

There may be multiple types of Attribute TLVs. Type=1 is defined as the Attribute Flags TLV. Each bit in the 4-octet Flags field of the Attribute Flags TLV indicates a certain attribute of the MPLS-TE tunnel. Currently, bits 0-18 are allocated in the Internet Assigned Numbers Authority (IANA) registry.

One or more Attribute TLVs (such as the Attribute Flags TLV) may be carried within an LSP_ATTRIBUTES Object and the LSP_REQUIRED_ATTRIBUTES Object.

The LSP_ATTRIBUTES Object is encoded with Class-Num as 197 and C-Type as 1, which uniquely identifies this Object within RSVP-TE messages. The LSP_ATTRIBUTES Object is used to signal attributes required in support of an MPLS-TE tunnel, or to indicate the nature or use of a MPLS-TE tunnel where that information is not required to be acted on by all transit Label Switch Routers (LSRs). More specifically, if an LSR does not support an object, then the LSR forwards the object unexamined and unchanged. This facilitates the exchange of attributes across legacy networks that do not support this new object. An LSP_ATTRIBUTES Object is OPTIONAL and may be placed in a Path Message to convey additional information about the desired attributes of the LSP, and on Resv messages to report an operational state.

The LSP_REQUIRED_ATTRIBUTES Object is encoded with Class-Num 67 and C-Type as 1, which uniquely identifies this Object within RSVP-TE messages. The LSP_REQUIRED_ATTRIBUTES Object is used to signal attributes required in support of a MPLS-TE tunnel, or to indicate the nature or use of a LSP where that information must be inspected at each transit LSR. More specifically, each transit LSR examines the attributes in the LSP_REQUIRED_ATTRIBUTES Object and does not forward the Object without acting on its contents. This is the difference of this object from the LSP_ATTRIBUTES Object.

To implement the desired functionality of the OPTIONAL BIER-TE Capability, one or more example embodiments may allocate, for example, bit-19 in the Flags field of the Attribute Flags TLV (bit-19=BIER-TE Capability). In this example, bit-19 may be referred to as the BIER-TE Capability bit. The BIER-TE capability bit indicates that the MPLS-TE tunnel may be used as underlay for BIER-TE and hence should be entered or installed into a TE-BIFT. If the BIER-TE capability bit is set, then the Attribute Flags TLV are carried only within the LSP_REQUIRED_ATTRIBUTES Object since the BIER-TE capability bit must be understood by all transit router/LSRs.

To implement the desired functionality of the BIER-TE BitString attribute, one or more example embodiments define a new Attribute TLV type referred to as the BIER-TE Attribute TLV. An example format of the BIER-TE Attribute TLV is shown in FIG. 25.

Referring to FIG. 25, in this example, the Type field value is 2. The Length field indicates the total length of the TLV in octets; that is, for example, the combined length of the Type, Length, and Value fields (e.g., four plus the length of the BitString field in octets). The length is variable and depends upon the length of the BitString field. The length of BitString field further depends on the BitString Length (BSL) used in BIER-TE packets across the network. For example, if the BSL is 256-bits, then the BitString field is one octet, if the BSL is 4096 bits, then BitString field is two octets, etc.

The BitString field carries the bit position of the MPLS-TE tunnel in the BitString of the BIER-TE packet. For example, if a BSL of 256-bits is used, then length of this field is one octet and may accommodate values in the range 0-255. In this case, the bit position may be calculated as (BitString value+1). So, value 0 refers to bit position 1 in the BitString in the BIER-TE packet (the lowermost bit), value 255 refers to bit position 256, the uppermost bit, and so on.

According to one or more example embodiments, the BIER-TE Attribute TLV is carried (e.g., only) within the LSP_REQUIRED_ATTRIBUTES Object since the bit must be understood by all transit routers/LSRs. A receiver processes the BIER-TE Attribute TLV (e.g., only) when the Attribute Flags TLV is also included with BIER-TE Capability bit.

As described above, according to one or more example embodiments, a BIER-TE header includes at least the following tuple:

{type=BIER-TE, srcSD, srcSI, srcBitString, BitString, dstSD, dstSI}

FIG. 14 illustrates an example BIER-TE header for a BIER-TE packet. As shown in FIG. 14, the BIER-TE header is similar to the BIER header shown in FIG. 6, except for the differences discussed below.

In contrast to the BIER header, the BIER-TE header includes a 'Ver/type' field rather than a 'Ver' field, further includes a 'BFIR-SD' field and further includes a 'RESERVED' field. The tuple shown above is mapped against the fields of the BIER header shown in FIG. 14.

In conventional BIER, BIFT-id is a MPLS label allocated and advertised by a BFR against a unique {dstSD, dstSI, BSL} using BIER control plane protocols such as OSPF, IS-IS, BGP-LS, etc. Since BIFT-id is an MPLS label, its value may be changed as a BIER packet goes from BFR to BFR. In BIER-TE, the 'BIFT-id' field is left unchanged. This field automatically carries the "partial" index to a TE-BIFT (e.g., the destination SubDomain and Set-id {dstSD, dstSI} part), which is mapped from the MPLS label received in this field.

Conventional BIER uses a value 0 for the 'Ver' field. For BIER-TE, on the other hand, the 'Ver/type' field value is defined as 1. A 'Ver/type' field having a value of 1 identifies the packet as a BIER-TE packet. Accordingly, the "Ver/type" field encodes the "type" of the tuple.

The 2-octet BFIR-SD field is present when the Ver/type field is set to 1 (when the packet is a BIER-TE packet). The BFIR-SD field encodes the source SubDomain srcSD (the SubDomain of the BFIR).

The 2-octet RESERVED field is present when the Ver/type field is set to 1. It should be noted that this field must be set to 0 by the sender if desired and should be ignored by receiver.

The BitString field carries the bits indicating the underlay MPLS-TE tunnels (e.g., the BitString in the tuple).

The dataplane of each BFR in a BIER-TE network maintains TE-BIFT tables as described above with regard to FIGS. 10A-10G. For processing a BIER-TE packet, the index to a TE-BIFT is {srcSD, srcSI, srcBitString, dstSD, dstSI}, wherein the respective fields in the index are derived from the BIER-TE header as follows:

srcSD=BFIR-SD in the BIER Header.
srcSI: srcBitString=BFIR-id
dstSD, dstSI=BIFT-id=MPLS label that maps to {dstSD, dstSI}

According to one or more example embodiments, a BIER-TE packet of a multicast flow is originated by a BFIR, which multicasts the BIER-TE packet to its list of unicast MPLS-TE tunnels (each tunnel ends at a BFER) that satisfies the QoS/TE constraints of the flow. An example embodiment of a method for configuring a router and selecting/identifying appropriate MPLS-TE tunnels is described above with regard to FIG. 15. Once the list of unicast MPLS-TE tunnels are configured at the router, the BFIR may multicast packets.

Figure 17:
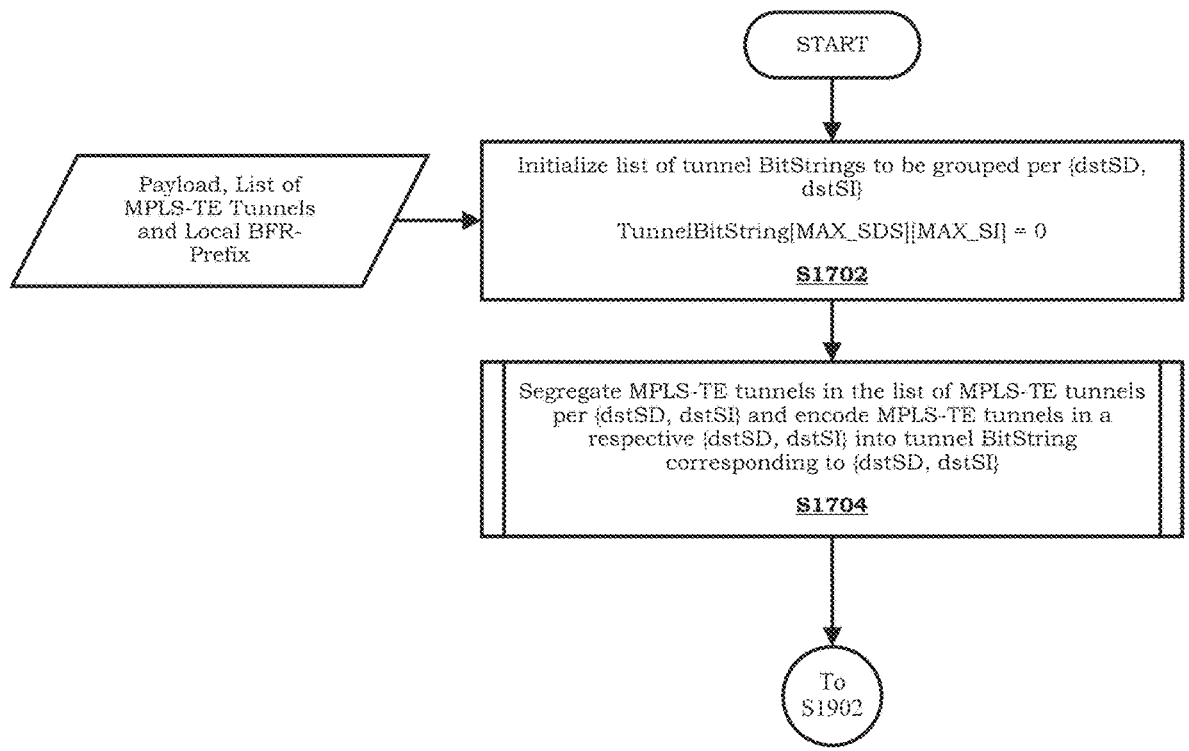
FIGS. 17, 18, 19 and 20 illustrate flow charts describing a method according to example embodiments.

FIG. 17 is a flow chart illustrating a method for originating a BIER-TE packet at an ingress router (BFIR) according to example embodiments. The method shown in FIG. 17 will be discussed with regard to router R1 shown in FIG. 12 for example purposes. According to at least this example embodiment, a payload (e.g., data, such as multimedia or other information, to be multicast), a list of all MPLS-TE tunnels (also referred to as a list or set of MPLS-TE tunnels), and a local BFR-Prefix are utilized as inputs in performing the algorithm.

The method multicasts the payload in BIER-TE packets using the set of MPLS-TE tunnels.

Referring to FIG. 17, at step S1702 the router R1 initializes a list of tunnel BitStrings to be grouped per destination SubDomain and Set-id {dstSD, dstSI}. In at least this example embodiment, the list of tunnel BitStrings is denoted as a 2D array, which is initialized as TunnelBitString[MAX_SD][MAX_SI]=0.

At step S1704, the router R1 segregates the MPLS-TE tunnels in the list of MPLS-TE tunnels (received as input) into subsets according to their destination routers. In one example, the router R1 segregates the MPLS-TE tunnels having the same destination SubDomain and Set-id {dstSD, dstSI} into respective subsets. Each subset of MPLS-TE tunnels sharing the same destination SubDomain and Set-id {dstSD, dstSI} is then encoded into a tunnel BitString corresponding to the destination SubDomain and Set-id {dstSD, dstSI}. Thus, each tunnel BitString encodes (represents) a subset of the MPLS-TE tunnels in the list of MPLS-TE tunnels to destination routers (e.g., BFERs) in a given destination SubDomain and BFR-set {dstSD, dstSI}.

Figure 19:
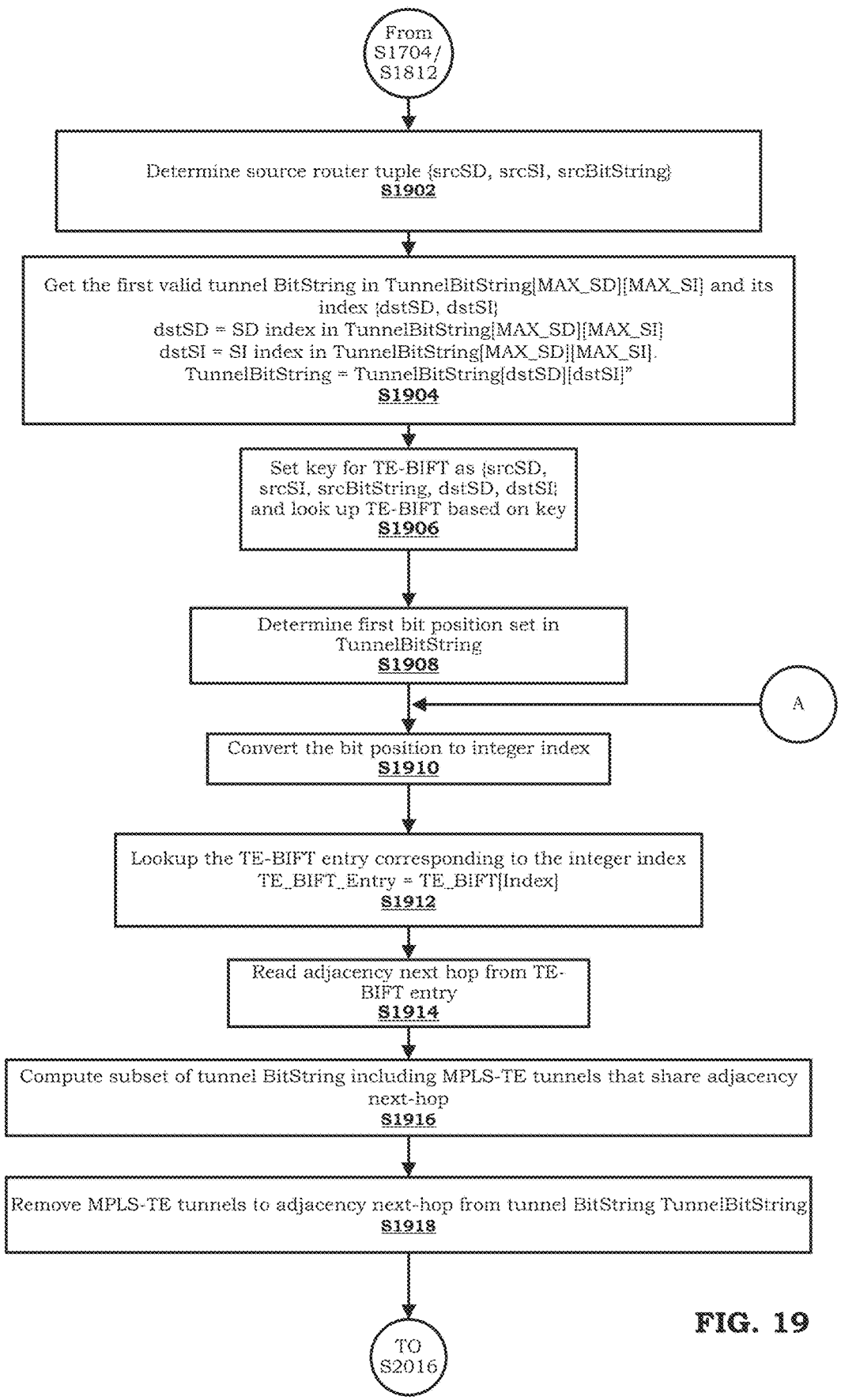

After segregating the tunnel BitStrings at step S1704, the process proceeds to step S1902 in FIG. 19. FIG. 19 will be discussed in more detail later.

Figure 18:
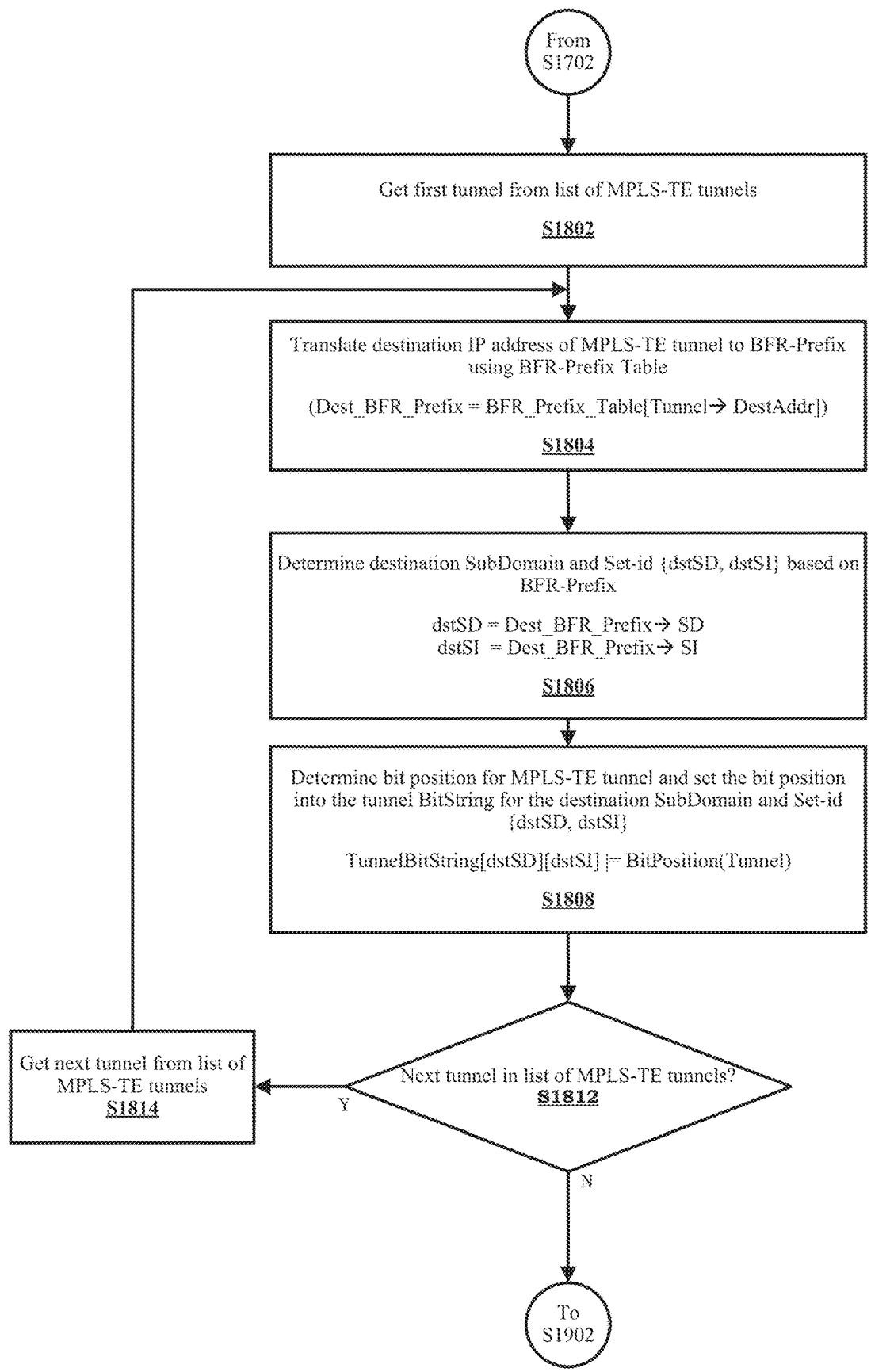

FIG. 18 is a flow chart illustrating an example embodiment of step S1704 in FIG. 17 in more detail.

Referring to FIG. 18, at step S1802, the router R1 reads the first MPLS-TE tunnel in the set of MPLS-TE tunnels.

At step S1804, the router R1 translates the destination IP address of the MPLS-TE tunnel into a corresponding BFR-Prefix of the destination router (BFER) for the MPLS-TE tunnel. In one example, the router R1 may perform this translation by looking up the destination IP address of the MPLS-TE tunnel as indexed in the BFR-Prefix Table of router R1.

At step S1806, the router R1 determines the destination SubDomain and Set-id {dstSD, dstSI} of the destination router of the MPLS-TE tunnel. In at least one example, the router R1 determines the destination SubDomain and Set-id {dstSD, dstSI} of the destination router based on the BFR-Prefix since the destination SubDomain and Set-id {dstSD, dstSI} is mapped to the BFR-prefix of the destination router (BFER).

At step S1808, the router R1 determines a bit position to be assigned to the MPLS-TE tunnel. In at least one example embodiment, the router R1 determines the bit position to be assigned to the MPLS-TE tunnel using the value of the tunnel identifier of the MPLS-TE tunnel as the bit position or using an explicit bit position assigned to the MPLS-TE tunnel according to the OPTIONAL BitString attribute in RSVP-TE as discussed above. The router R1 then sets the bit position (e.g., to a value of '1') of the MPLS-TE tunnel into the tunnel BitString for the destination SubDomain and Set-id {dstSD, dstSI}; that is, for example, TunnelBitString[dstSD][dstSI] |=BitPosition(Tunnel).

At step S1812, the router R1 determines whether the current MPLS-TE tunnel is the last tunnel in the list of MPLS-TE tunnels.

If the router R1 determines that the current MPLS-TE tunnel is the last tunnel in the list of MPLS-TE tunnels at step S1812, then the process proceeds to step S1902 in FIG. 19.

Returning to step S1812, if the router R1 determines that the current MPLS-TE tunnel is not the last tunnel in the list of MPLS-TE tunnels, then the router R1 obtains the next MPLS-TE tunnel from the list of MPLS-TE tunnels at step S1814. The process then returns to step S1804 and continues as discussed above for the next MPLS-TE tunnel.

At the completion of the steps in FIG. 18 (and step S1704 in FIG. 17), each MPLS-TE tunnel in the list (or set) of MPLS-TE tunnels may be set as a bit position in a tunnel BitString, among a list of tunnel BitStrings, corresponding to the destination SubDomain and Set-id {dstSD, dstSI} of the MPLS-TE tunnel. For example, in router R1 in FIG. 12, for the multicast flow MCAST_1, the list of MPLS-TE tunnels comprises of LSP_R1_R6_1, LSP_R1_R7_4 and LSP_R1_R8_7. In this case, all the MPLS-TE tunnels in the list are terminated on the same destination SubDomain and Set-id {1,0}. Using the tunnel identifiers of the MPLS-TE tunnels as bit positions, the resultant tunnel BitString corresponding to destination SubDomain and Set-id {1,0} is 0x0001001001, i.e., TunnelBitString[1][0]=0x0001001001.

Referring now to FIG. 19, at step S1902 the router R1 determines the source router tuple {srcSD, srcSI, srcBitString} to be encoded into the BIER-TE packet to be multicast by the router R1. The source router tuple {srcSD, srcSI, srcBitString} in the BIER-TE packet identifies the originating router of the BIER-TE packet (which is router R1 in this example). The source router tuple {srcSD, srcSI, srcBitString} is generated from the source SubDomain and Set-id {srcSD, srcSI} and the source BitString srcBitString associated with the input local BFR-Prefix. The source BitString srcBitString is the set with only one bit, which is the bit position assigned to identify the source router (router R1) within the source SubDomain and Set-id {srcSD, srcSI}.

At step S1904, router R1 obtains the first tunnel BitString from the set of tunnel BitStrings; that is the first valid entry from TunnelBitString[MAX_SD][MAX_SI]. The index of the first tunnel BitString is read as the destination SubDomain and Set-id {dstSD, dstSI}. In this case, the first tunnel BitString obtained at step S1904 is denoted TunnelBitString [dstSD] [dstSI] or more simply TunnelBitString.

At step S1906, the router R1 sets a key for the TE-BIFT as {srcSD, srcSI, srcBitString, dstSD, dstSI} by combining the source SubDomain and Set-id {srcSD, srcSI}, the source BitString srcBitString and the destination SubDomain and Set-id {dstSD, dstSI}. The key identifies the TE-BIFT that contains tunnel BitStrings corresponding to all MPLS-TE tunnels originating from router R1 to destination routers in the destination SubDomain and Set-id {dstSD, dstSI}. The router R1 utilizes the key to look up a TE-BIFT.

At step S1908, the router R1 determines the first bit position set in the tunnel BitString TunnelBitString.

At step S1910, the router R1 converts the bit position to an integer index. In one example, if the bit position is 3 (i.e., . . . 001000 in BitString format), then the integer index is $2^3=8$.

At step S1912, the router R1 looks up a TE-BIFT entry based on the integer index determined at step S1910. The TE-BIFT entry contains the forwarding information (e.g., adjacency next-hop, F-BM, etc.) for the MPLS-TE tunnel identified by the bit position in the tunnel BitString Tunnel-BitString. In the example shown in FIG. 13A, the TE-BIFT-R1 entry corresponding to the integer index 8 includes BitString=0x0010000000, F-BM=0x0010000000, and adjacency next-hop R1→R4.

At step S1914, the router R1 reads the adjacency next-hop for the MPLS-TE tunnel from the TE-BIFT entry. As mentioned above, the F-BM in the TE-BIFT entry is a BitString containing bit positions of all MPLS-TE tunnels in this TE-BIFT that share the adjacency next-hop. With regard to the TE-BIFT-R1 in FIG. 13A, for example, the F-BM corresponding to integer index 8 is 0x0010000000 since only the MPLS-TE tunnel corresponding to tunnel BitString 0x0010000000 has the adjacency next-hop R1→R4. On the other hand, the F-BM corresponding to integer index 3 is 0x0000010100 since the MPLS-TE tunnels corresponding to tunnel BitString 0x000010000 and tunnel BitString 0x000000100 share the adjacency next-hop R1→R5.

At step S1916, the router R1 computes a subset of the tunnel BitString TunnelBitString identifying and/or including only MPLS-TE tunnels sharing the adjacency next-hop based on the tunnel BitString TunnelBitString and the F-BM of the TE-BIFT entry looked up at step S1912. The router R1 generates the subset of the tunnel BitString TunnelBitString by performing a bitwise-AND operation between the tunnel BitString TunnelBitString and the F-BM. This operation may be denoted as "subset of the TunnelBitString=(TunnelBitString) & (F-BM)".

At step S1918, the router R1 removes the set bit positions in the subset of the tunnel BitString TunnelBitString from the tunnel BitString TunnelBitString such that only bit positions for MPLS-TE tunnels to other adjacency next-hops, which have not yet been identified (looked up) in a TE-BIFT, remain in the updated tunnel BitString TunnelBitString. In one example, the removal operation may be performed by performing a bitwise-AND operation between the tunnel BitString TunnelBitString and the bitwise-inverse of the F-BM of the TE-BIFT entry looked up at step S1912.

This operation may be denoted as "UpdatedTunnelBitString=TunnelBitString & ~(F-BM)". The process then continues to FIG. 20. As discussed herein, UpdatedTunnelBitString refers to the updated TunnelBitString.

Figure 20:
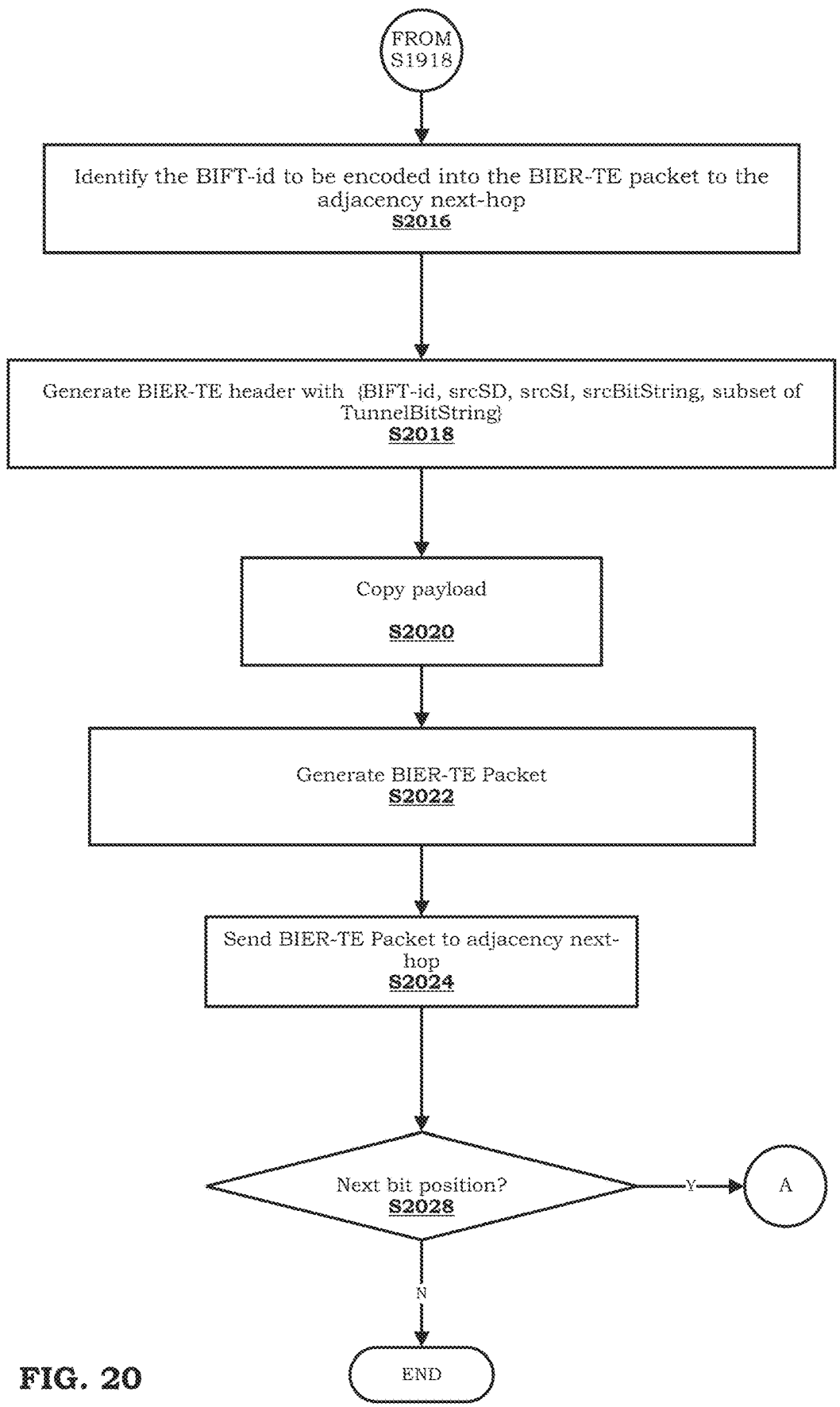

In the operations illustrated in the flow chart in FIG. 20, the router R1 creates a BIER-TE packet by encoding the subset of tunnel BitString TunnelBitString (from step S1916) with the payload and sends the BIER-TE packet to the adjacency next-hop. After sending the BIER-TE packet, the process terminates or returns to step S1910 and continues as discussed herein for the next bit position in the tunnel BitString TunnelBitString.

In more detail, referring to FIG. 20, at step S2016, the router R1 identifies the BIFT-id to be encoded into the BIER-TE packet to the adjacency next-hop. In one example, the router R1 identifies the BIFT-id based on the BIFT-id assigned by the adjacency next-hop (and may be advertised via the BIER control plane) for the destination SubDomain and Set-id {dstSD, dstSI}. The BIFT-id signifies the destination SubDomain and Set-id {dstSD, dstSI} associated with the BIER-TE packet.

At step S2018, the router R1 generates a BIER-TE header including at least the tuple {BIFT-id, srcSD, srcSI, srcBitString, subset of TunnelBitString}. The router R1 may generate the BIER-TE header by encoding the BIER-TE header with the tuple as described above with regard to FIG. 14.

At step S2020, the router R1 generates a copy of the payload, which is to be sent in the BIER-TE packet to the adjacency next-hop.

At step S2022, the router R1 creates the BIER-TE packet to be sent to the adjacency next-hop by adding the BIER-TE header to the copy of the payload generated at step S2018.

At step S2024, the router R1 sends the BIER-TE packet to the adjacency next-hop.

At step S2028, the router R1 determines whether the tunnel BitString UpdatedTunnelBitString (from step S1918) includes a next bit position (Next BitPos) identifying remaining MPLS-TE tunnels to other adjacency next-hops.

If the tunnel BitString UpdatedTunnelBitString does not include a next bit position, then the router R1 determines that the BIER-TE packet(s) have been sent for all input MPLS-TE tunnels and the process terminates.

Returning to step S2028, if the tunnel BitString UpdatedTunnelBitString includes a next bit position, then the process returns to step S1910 in FIG. 19 and continues as discussed herein.

Example pseudo-code for implementing one or more example embodiments discussed above with regard to FIGS. 17-20 is shown below.

In this example, inputs include "Payload," which is a packet from the user of BIER-TE (from the multicast flow overlay), List_of all_MPLS_TE_Tunnels[ ], which is a list of MPLS-TE tunnels to be encoded in BIER-TE packet and Orig_BFR_IP_Address. The Orig_BFR_IP_Address is a loopback IP address of "this" router (which is the originating BFR). This IP address is the Source IP address of all MPLS-TE tunnels in List_of all_MPLS_TE_Tunnels[ ].

```
void BIER_TE_Multicast(Payload,
    List_of_all_MPLS_TE_Tunnels[ ],
                    Orig_BFR_IP_Address)
{
    // Initialize list of tunnel BitStrings to be
    grouped per {dstSD, dstSI}.
```

```
        <BitString>
TunnelBitString_Per_SD_SI[MAX_SD][MAX_SI] = 0;
        // Segregate the tunnels per {dstSD, dstSI} and
set the bit positions of
        // segregated tunnels into the BitString in
corresponding {dstSD, dstSI}
        for each Tunnel in List_of_all_MPLS_TE_Tunnels[ ]
        {
            // Source address of tunnel must be the IP
address used to identify
            // the local BFR. If not then this is error.
            if (Tunnel->SourceAddr !=
Orig_BFR_IP_Address)
            {
                declare_error;
                // skip this Tunnel from BIER-TE
multicast and go to next tunnel.
                continue;
            }
            // Lookup the tunnel's destination IP
address as BFR-Prefix, to
            // translate it into destination's global
BFR identifier.
            // {dstSD, dstSI} is the {SD, SI} in
destination's global BFR
            // identifier.
            <SD, SI, BitString> Dest_BFR =
BFR_Prefix_Table[Tunnel->DestAddr];
            // Insert the tunnel into BitString for its
{dstSD, dstSI}.
            TunnelBitString_Per_SD_SI[Dest_BFR-
>SD][Dest_BFR->SI] |=
convertToBitPosition (Tunnel->tunnelID);
        }
        // Lookup the Orig_BFR_IP_Address as BFR-Prefix,
to translate it into
        // global BFR identifier. The global BFR
identifier is needed to encode
        // the {srcSD, srcSI} on each BIER-TE packet.
        <SD, SI, BitString> Source_BFR =
BFR_Prefix_Table[Orig_BFR_IP_Address];
        // Now segregate each tunnel BitString per
{dstSD, dstSI} into subsets,
        // wherein each subset shares a common next-hop.
Send a BIER-TE
        // packet for each subset to its corresponding
next-hop. A BIER-TE
        // packet encodes the subset bits in its
BitString.
        for each dstSD in TunnelBitString_Per_SD_SI[ ][ ]
        {
            for each dstSI in
TunnelBitString_Per_SD_SI[dstSD][ ]
            {
                // Get the appropriate TE-BIFT to
forward the TunnelBitString in
                // this {dstSD, dstSI}.
                TE_BIFT = Get TE_BIFT indexed by
{Source_BFR->SD,
Source_BFR->SI,
Source_BFR->BitString,
                                                dstSD,
dstSI};
                // Just for easy reference to the tunnel
BitString for this
                // {dstSD, dstSI}
                TunnelBitString =
TunnelBitString_Per_SD_SI[dstSD][dstSI];
                // Segregate the TunnelBitString into
subsets per next-hop and
                // send BIER-TE packet to each subset.
                for (Index =
GetFirstBitPosition(TunnelBitString); Index ;
                        Index =
GetNextBitPosition(TunnelBitString, Index))
                {
                    // Get the forwarding bit mask that
contains bits for all
                    // tunnels sharing the same next-hop
as the current bitPos.
                    F-BM = TE_BIFT[Index]->F-BM;
                    if (!F-BM) continue;
                    // Lookup the next-hop for the
current bitPos in TE-BIFT.
                    NextHop = TE_BIFT[Index]->NextHop;
                    // Get the subset bits for this
next-hop.
                    <BitString> SubsetBitString =
TunnelBitString & F_BM;
                    // Get the BIFT-id advertised by
next-hop for the
                    // {dstSD, dstSI}
                    NextHop_BIFT_id = BIER-TE BIFT-id
advertised by NextHop for
                                                this {dstSD,
dstSI}.
                    // Encode BIER-TE header as
described in FIG. 14
                    BIER_TE_Header =
                        BIER_Header(BIFT_id =
NextHop_BIFT_id,
                                                srcSD =
Source_BFR->SD,
                                                srcSI =
Source_BFR->SI,
                                                srcBitString =
Source_BFR->BitString,
                                                BitString =
SubsetBitString);
                    // Make a copy of payload, add BIER-
TE Header onto it to
                    // generate the BIER-TE packet.
                    BIER_TE_Packet = BIER_TE_Header +
Copy(Payload);
                    // Send the BIER-TE packet to next-
hop.
                    PacketSend(BIER_TE_Packet, NextHop);
                    // Reset the subset in the tunnel
BitString.
                    TunnelBitString &= ~F-BM;
                }
            }
        }
    }
```

Figure 21:
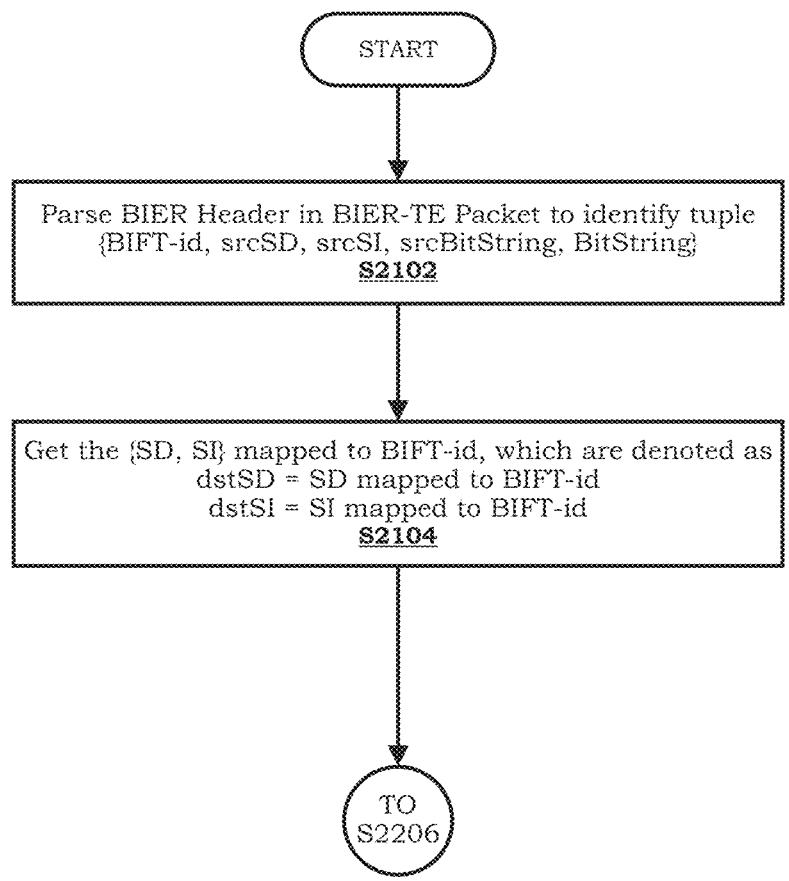
FIGS. 21, 22 and 23 illustrate flow charts describing a method according to example embodiments.
Figure 22:
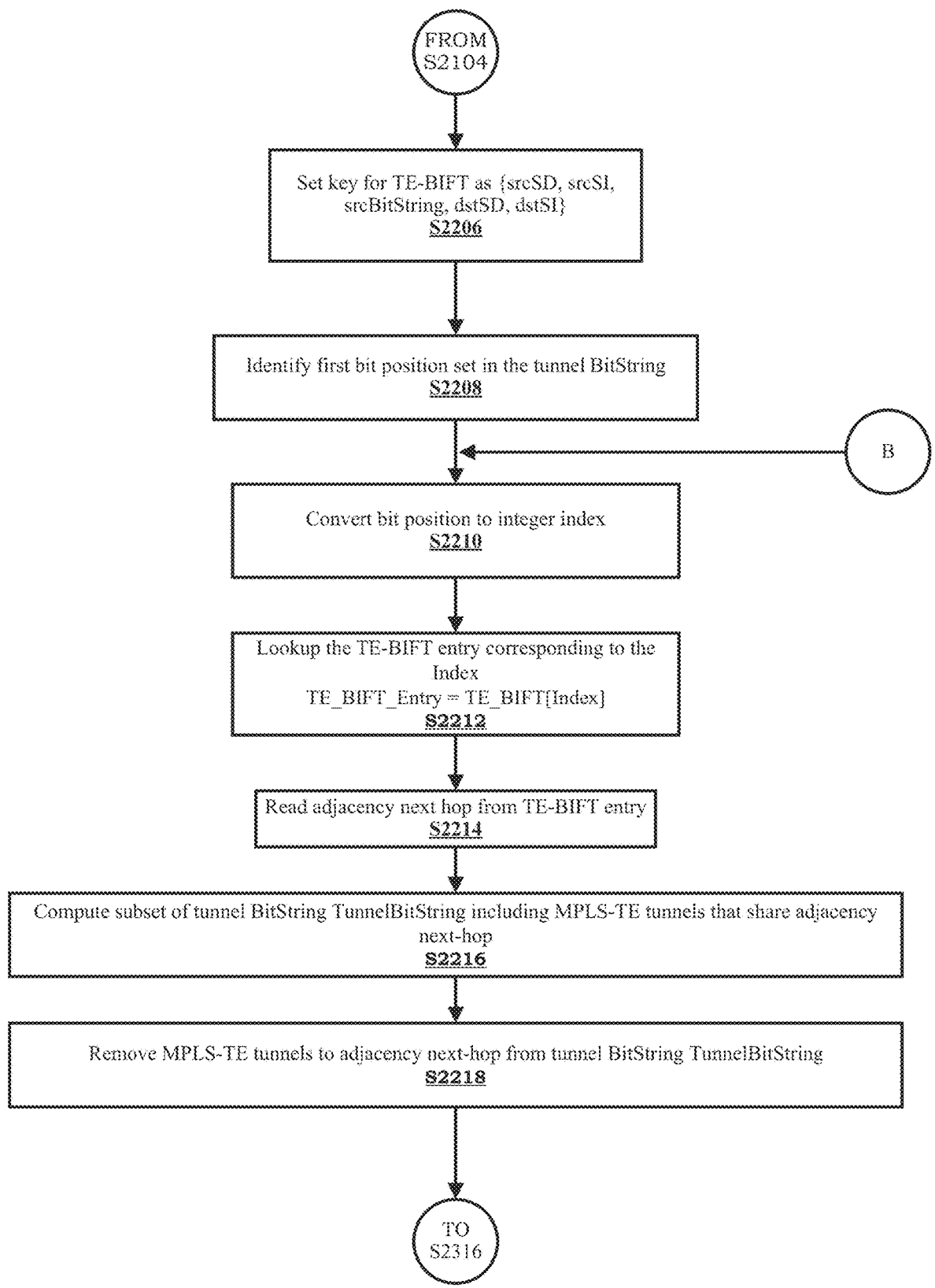
Figure 23:
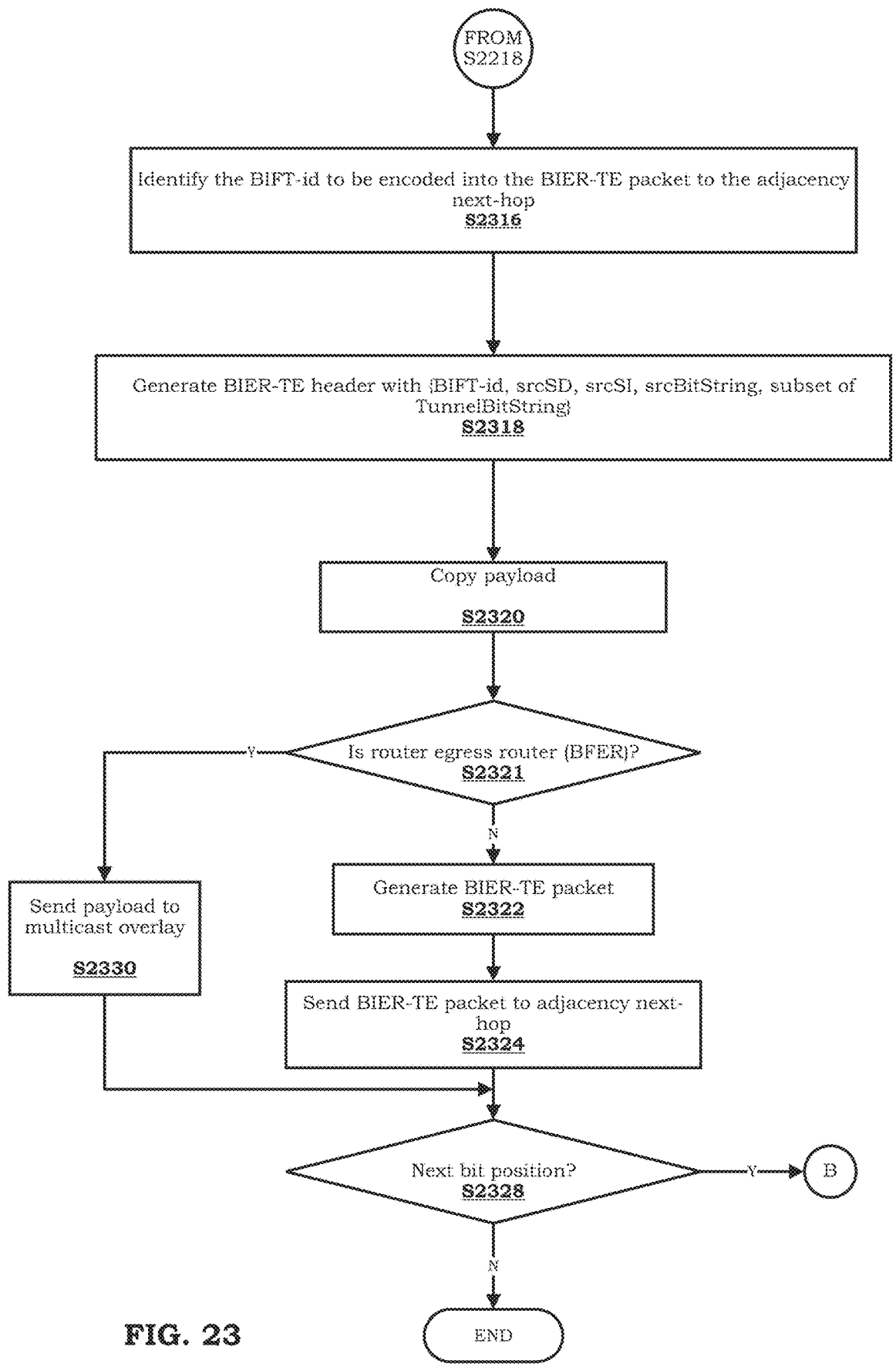

FIGS. 21-23 illustrate flow charts describing a method for processing a received BIER-TE packet at a transit router or an egress router according to example embodiments. In some instances, the method shown in FIGS. 21-23 will be discussed with regard to router R4 for example purposes.

Referring to FIG. 21, at step S2102, upon receipt of a BIER-TE packet router R4 parses the BIER-TE header to generate the tuple {BIFT-id, srcSD, srcSI, srcBitString, TunnelBitString} from the fields in BIER-TE header.

At step S2104, router R4 determines the SubDomain and the Set-id {SD, SI} mapped locally by router R4 to the BIFT-id. The resultant SubDomain and Set-id {SD, SI} is the destination SubDomain and Set-id {dstSD, dstSI} associated with the tunnel BitString TunnelBitString. The process then proceeds to step S2206 in FIG. 22.

Referring to FIG. 22, at step S2206, the router R4 sets the key for TE-BIFT as the tuple {srcSD, srcSI, srcBitString, dstSD, dstSI} obtained at steps S2102 and S2104. The key identifies the TE-BIFT in router R4 that includes entries for all MPLS-TE tunnels originating from the router identified by the tuple {srcSD, srcSI, srcBitString} to destination routers in the destination SubDomain and Set-id {dstSD, dstSI}. As discussed in more detail below with regard to steps S2208-2212, the router R4 may look up the TE-BIFT based on the key.

At step S2208, the router R4 identifies the first bit position set in the received tunnel BitString TunnelBitString.

At step S2210, the router R4 converts the identified bit position to an integer index. The router R4 may convert the bit position to an integer index in the same or substantially the same manner as discussed above with regard to step S1910 in FIG. 19.

At step S2212, the router R4 looks up a TE-BIFT entry based on the integer index determined at step S2210. The TE-BIFT entry corresponding to the integer index includes the forwarding information (e.g., adjacency next-hop, F-BM, etc.) for the MPLS-TE tunnel identified by the bit position.

At step S2214, the router R4 reads the adjacency next-hop from the TE-BIFT entry obtained at step S2212.

At step S2216, the router R4 computes a subset of the tunnel BitString TunnelBitString identifying and/or including only MPLS-TE tunnels that share the adjacency next-hop read at step S2214. In at least one example embodiment, the router R4 computes this subset of the tunnel BitString TunnelBitString by performing a bitwise-AND operation between the tunnel BitString TunnelBitString and the F-BM of the TE-BIFT entry looked up at step S2212.

At step S2218, the router R4 removes the set bit positions in the subset of the tunnel BitString TunnelBitString from the tunnel BitString TunnelBitString such that only bit positions for MPLS-TE tunnels to adjacency next-hops, which have not yet been identified (looked up) in the TE-BIFT, remain in the tunnel BitString TunnelBitString. In one example, the router R4 removes the subset of the tunnel BitString TunnelBitString from the tunnel BitString TunnelBitString by performing a bitwise-AND operation between the tunnel BitString TunnelBitString and the bitwise-inverse of F-BM in the same or substantially the same manner as discussed above with regard to step S1918 in FIG. 19.

The process then continues to step S2316 in FIG. 23.

Referring to FIG. 23, at step S2316 the router R4 identifies the BIFT-id to be encoded into the BIER-TE packet to be sent to the adjacency next-hop. The router R4 may identify the BIFT-id in the same or substantially the same manner as discussed above with regard to step S2016 in FIG. 20.

At step S2318, the router R4 generates the BIER-TE header with the tuple {BIFT-id, srcSD, srcSI, srcBitString, subset of TunnelBitString}. The router R4 may generate the BIER-TE header in the same or substantially the same manner as discussed above with regard to step S2018.

At step S2320, the router R4 generates a copy of the payload.

At step S2321, if the router is an egress router (BFER), then the router sends the packet to the multicast overlay at step S2330 for further processing. The process then proceeds to step S2328 and continues as discussed herein.

Returning to step S2321, since router R4 is not an egress router, at step S2322 the router R4 creates the BIER-TE packet to be sent to this adjacency next-hop by adding the BIER-TE header generated at step S2018 to the copy of the payload generated at step S2320.

At step S2324, the router R4 sends the BIER-TE packet to the adjacency next-hop.

At step S2328, the router R4 determines whether the updated tunnel BitString TunnelBitString includes a next bit position identifying remaining MPLS-TE tunnels to other adjacency next-hops. That is, for example, the router R4 determines whether there are remaining MPLS-TE tunnels to other adjacency next-hops remaining in the updated tunnel BitString TunnelBitString.

If the updated tunnel BitString TunnelBitString does not include a next bit position, then the router R4 determines that the BIER-TE packet(s) have been forward to all necessary adjacency next-hops and the process terminates for the received BIER-TE packet.

Returning to step S2328, if the updated tunnel BitString TunnelBitString includes a next bit position, then the process returns to step S2210 in FIG. 22 and continues as discussed above for the next bit position.

Example pseudo-code implementing one or more example embodiments shown in FIGS. 21-23 is shown below.

```
void Process_BIER_TE_Packet (Packet)
{
    // Parse the BIER Header from the received packet.
        BIER_TE_Header = Parse_BIER_Header(Packet);
        // BIFT_id in the BIER-TE Header is advertised by this router to
        // all neighbors against a specific {dstSD, dstSI}, which is encoded
        // by neighbors in BIER-TE Packets sent to this router on the
        // {dstSD, dstSI}. So, get the {dstSD, dstSI} mapped to the BIFT_id in
        // BIER-TE Header.
        {dstSD, dstSI} = Get the {SD, SI} mapped to BIER_Header->BIFT_id;
        // Get the appropriate TE-BIFT to forward this packet.
        TE_BIFT = Get TE_BIFT indexed by {BIER_TE_Header->srcSD,
        BIER_TE_Header->srcSI,
        BIER_TE_Header->srcBitString,
                            dstSD, dstSI}
        // Segregate the received tunnel BitString into subsets per next-hop and
        // send BIER-TE packet to each subset.
        for (Index = GetFirstBitPosition(BIER_TE_Header->BitString); Index ;
                Index = GetNextBitPosition(BIER_TE_Header->BitString, Index)) {
            // Get the forwarding bit mask that contains bits for all
            // tunnels sharing the same next-hop as the current bitPos.
            F-BM = TE_BIFT[Index]->F-BM;
            if (!F-BM) continue;
            // Lookup the next-hop for the current bitPos in TE-BIFT.
            NextHop = TE_BIFT[Index]->NextHop;
            // Make a copy of the payload for this next-hop.
            PayloadCopy = Copy(Packet->Payload);
            // If this is egress router (BFER) for this MPLS-TE tunnel then send
            // the copy of the Payload to multicast overlay. Else send the
            // BIER-TE packet to the next-hop.
            if (NextHop->isLocal)
            {
                SendToMulticastOverlay(PayloadCopy);
            }
            else
            {
                // Get the subset bits for this next-hop.
                <BitString> SubsetBitString = BIER_TE_Header->BitString & F_BM;
                // Get the BIFT-id advertised by next-hop for the
                // {dstSD, dstSI]
                NextHop_BIFT_id = BIER-TE BIFT-id advertised by NextHop for
                            this {dstSD, dstSI}.
                // Encode BIER-TE header as described in FIG. 14.
                NextHop_BIER_TE_Header =
```

-continued

```
            BIER_Header(BIFT-id =
NextHop_BIFT_id,
                     srcSD =
    BIER_TE_Header->SD,
                     srcSI =
    BIER_TE_Header->SI,
                     srcBitString =
    BIER_TE_Header->srcBitString,
                     BitString =
    SubsetBitString);
            // Add BIER-TE Header onto Payload copy
    to generate the BIER-TE
            // packet to this next-hop.
            BIER_TE_Packet = NextHop_BIER_TE_Header
    + PayloadCopy;
            PacketSend(BIER_TE_Packet, NextHop);
        }
        // Reset the subset in the received tunnel
    BitString.
        BIER_TE_Header->BitString &= ~F-BM;
    }
}
```

According to one or more example embodiments, BIER-TE overlays the stateless explicit path multicast tree over traffic engineered unicast MPLS-TE tunnels. So, example embodiments may suppress the need to compute traffic engineered explicit path multicast tree separately, as required in conventional BIER-TE.

A BIER-TE multicast tree may span across any number of subdomains and BFR sets (BFIR, BFERs and transit BFRs may be located in disjointed subdomains and BFR sets). Accordingly, BIER-TE may scale to any number of BFERs.

In one example, a BitString in BIER-TE encodes 1 bit for 1 unicast MPLS-TE tunnel (e.g., to single BFER). Thus, the number of bits in the BitString is equal to number of BFERs in a destination SubDomain and Set-id {dstSD, dstSI}. As a result, the number of lookups in a TE-BIFT is the same as number of next-hops to which the packet must be forwarded, and it is not necessary to perform a separate lookup for each bit in the BitString. Thus, more optimal forwarding may be achieved irrespective of the size of BitString.

According to one or more example embodiments, a transit BFR may always receive the relevant bits only in the BitString.

According to one or more example embodiments, the length of the BitString may not have any linear dependency on the size of the network (number of adjacencies and BFERs). If a 256-bit BitString is used, then the solution may accommodate up to 256 BFERs within a single subdomain and BFR set, irrespective of the number of adjacencies in the subdomain and BFR set. If number of BFERs is greater than 256, then the BFERs may span across multiple subdomains and Set-ids.

At least some example embodiments, a SDN controller is not required, and thus, a relatively wide scope of deployments may be achieved.

MPLS-TE tunnels have built-in protection mechanisms (e.g., Fast ReRoute (FRR)), which are seamlessly applicable to one or more example embodiments. At least some example embodiments need not include additional protection mechanisms as required by conventional BIER.

One or more example embodiments may be more easily deployable in existing RSVP-TE based MPLS-TE deployments. In accordance with one or more example embodiments, BIER-TE becomes an overlay of existing MPLS-TE infrastructure. Enhancements to RSVP-TE are optional.

One or more example embodiments provide an upgrade path in service provider deployments to add for stateless multicast with TE or replace existing P2MP RSVP-TE.

Figure 24:
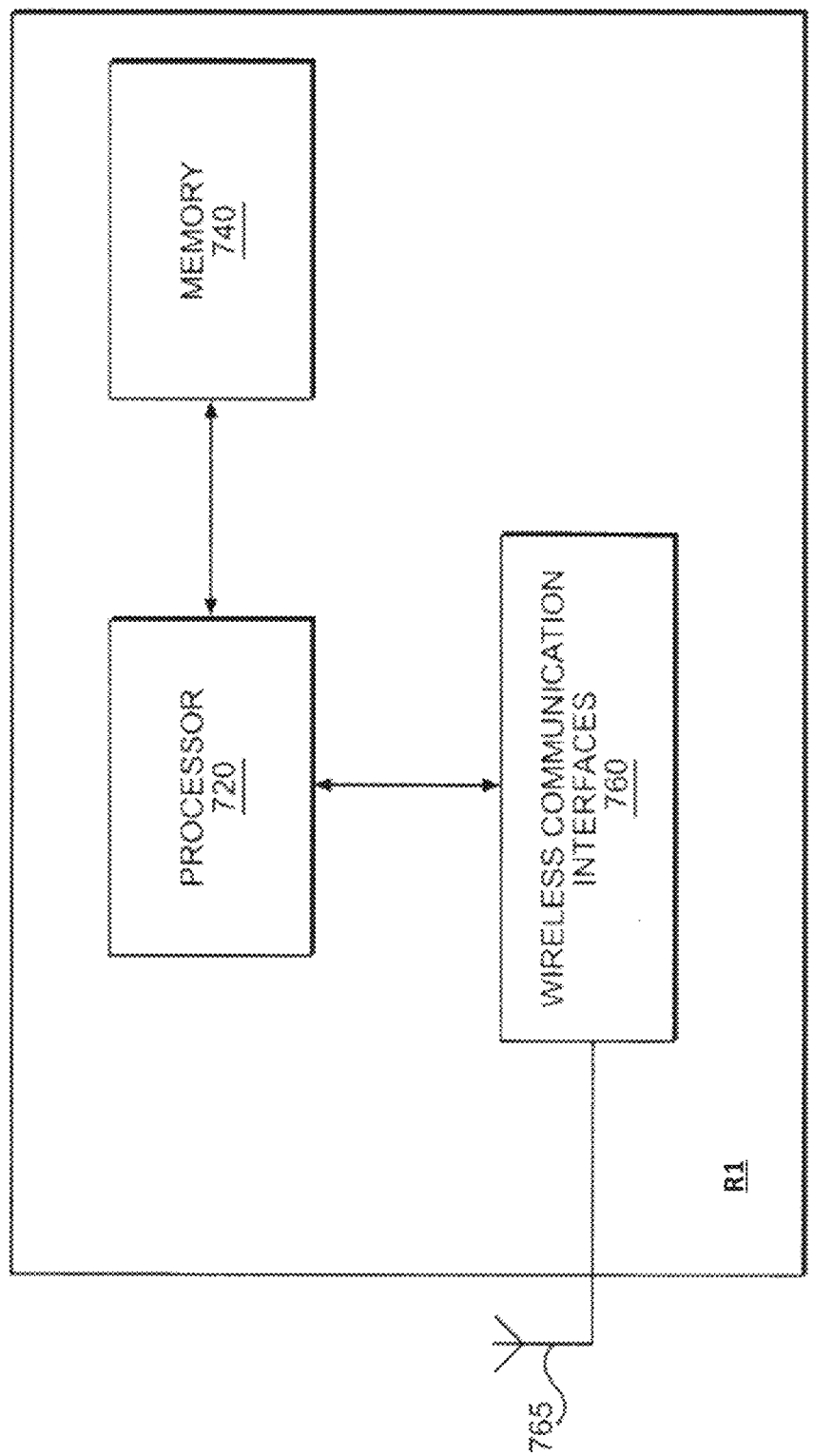
FIG. 24 illustrates an example embodiment of a Bit Forwarding Router (BFR).

FIG. 24 illustrates an example embodiment of a BFR, such as router R1 shown in FIG. 12.

As shown, the BFR R1 includes: a memory 740; a processor 720 connected to the memory 740; various interfaces 760 connected to the processor 720; and one or more antennas or antenna panels 765 connected to the various interfaces 760. The various interfaces 760 and the antenna 765 may constitute a transceiver for transmitting/receiving data from/to the other BFRs and/or LANs via a wired or wireless links. As will be appreciated, depending on the implementation of the BFR R1, the BFR R1 may include many more components than those shown in FIG. 24. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the BFR R1 (e.g., functionalities of a BFR, BFIR, BFER, etc., methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the BFR R1 will vary depending on the implementation of the BFR R1.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 24 may be utilized to implement, inter alia, the other BFRs, BFIRs, BFERs, other radio access and backhaul network elements and/or devices. In this regard, for example, the memory 740 may store an operating system and any other routines/modules/applications for providing the functionalities of the BFRs, BFIRs, BFERs, etc. (e.g., functionalities of these elements, methods according to the example embodiments, etc.) to be executed by the processor 720.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements, network devices, data servers, network resource controllers, clients, routers (e.g., BFRs, BFERs, BFIRs, etc.), gateways, nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although example embodiments are discussed herein with regard to data servers, network devices may also include be network elements such as network resource controllers, clients, routers (e.g., BFRs, BFERs, BFIRs, etc.), gateways, nodes, computers, cloud-based servers, web servers, application servers, proxies or proxy servers, or the like.

According to example embodiments, network elements, network devices, data servers, network resource controllers, clients, routers (e.g., BFRs, BFERs, BFIRs, etc.), gateways, nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A router comprising:
   at least one processor; and
   at least one memory including computer program code, the at least one memory and the computer program code configured to, with the at least one processor, cause the router to
   determine source router identification information for a plurality of tunnels traversing the router based on a routable source IP address for each of the plurality of tunnels, each tunnel of the plurality of tunnels representing a path from a source router to one respective destination router,
   determine destination router identification information for each tunnel of the plurality of tunnels based on a routable destination IP address for the tunnel,
   program a bit string entry for each tunnel of the plurality of tunnels in a Bit Index Forwarding Table (BIFT) for tunnels from the source router to a plurality of destination routers, the BIFT being indexed based on the source router identification information and at least a portion of the destination router identification information, and
   route packet data received at the router to any subset of tunnels according to the BIFT.

2. The router of claim 1, wherein the at least one memory and the computer program code are further configured to, with the at least one processor, cause the router to generate a first bit string entry for a first of the plurality of tunnels in response to a Bit Index Explicit Replication (BIER) capability attribute received in a Resource Reservation Protocol (RSVP) path message for the first of the plurality of tunnels.

3. The router according to claim 2, wherein the at least one memory and the computer program code are further configured to, with the at least one processor, cause the router to
   generate a first bit string value for the first of the plurality of tunnels based on a first BIER bit string attribute received in the RSVP path message for the first of the plurality of tunnels, and
   program the first bit string value as the first bit string entry.

4. The router according to claim 1, wherein the at least one memory and the computer program code are further configured to, with the at least one processor, cause the router to
   generate a first bit string value for a first of the plurality of tunnels based on a first BIER bit string attribute received in a RSVP path message for the first of the plurality of tunnels, and
   program the first bit string value as the bit string entry for the first of the plurality of tunnels.

5. The router according to claim 1, wherein, for each tunnel, the source router identification information includes a source subdomain, a source set identifier and a source bit string associated with a source router.

6. The router according to claim 1, wherein, for each tunnel, the destination router identification information includes a destination subdomain, a destination set identifier and a destination bit string associated with a destination router.

7. The router according to claim 6, wherein the at least one memory and the computer program code are further configured to, with the at least one processor, cause the router to
   determine whether a MPLS label has been allocated for the destination subdomain and the destination set identifier; and
   allocate a MPLS label for the destination subdomain and the destination set identifier in response to determining that a MPLS label has not been allocated for the destination subdomain and the destination set identifier.

8. The router according to claim 1, wherein the at least one memory and the computer program code are further configured to, with the at least one processor, cause the router to
   determine whether the BIFT exists prior to programming bit string entries for the plurality of tunnels; and
   generate the BIFT in response to determining that the BIFT does not exist.

9. The router according to claim 1, wherein the plurality of tunnels are Multiprotocol Label Switching-Traffic Engineering (MPLS-TE) tunnels and the BIFT is a Traffic Engineering-BIFT (TE-BIFT).

10. A router comprising:
    at least one processor; and
    at least one memory including computer program code, the at least one memory and the computer program code configured to, with the at least one processor, cause the router to
    segregate a plurality of tunnels into a plurality of subsets of tunnels based on destination subdomain and set identification information for the plurality of tunnels, each tunnel of the plurality of tunnels representing a path from a source router to one respective destination router,
    encode bit strings of each of the tunnels in a first subset of tunnels among the plurality of subsets of tunnels to generate a first tunnel bit string, and
    route packet data received at the router to any subset of tunnels according to a Bit Index Forwarding Table (BIFT) by generating a BIER packet for an adjacency next-hop of at least a first of the plurality of tunnels corresponding to the first tunnel bit string, and sending the BIER packet to the adjacency next-hop.

11. The router of claim 10, wherein the tunnels in the first subset of tunnels have a same destination subdomain and destination set identifier.

12. The router according to claim 10, wherein the at least one memory and the computer program code are further configured to, with the at least one processor, cause the router to identify a first bit position in the first tunnel bit string, and obtain the adjacency next-hop from a BIFT entry based on the first bit position in the first tunnel bit string.

13. The router according to claim 12, wherein the at least one memory and the computer program code are further configured to, with the at least one processor, cause the router to convert the first bit position into an integer index, and look up the BIFT entry based on the integer index to obtain the adjacency next-hop.

14. The router according to claim 10, wherein the at least one memory and the computer program code are further configured to, with the at least one processor, cause the router to generate a subset tunnel bit string based on the first tunnel bit string, the subset tunnel bit string including set bit positions corresponding to only tunnels sharing the adjacency next-hop, generate a BIER header for the BIER packet, the BIER header including source router identification information for at least the first of the plurality of tunnels, destination subdomain and set identifier information for at least the first of the plurality of tunnels, and the subset tunnel bit string, and generate the BIER packet including the BIER header and a payload.

15. The router according to claim 14, wherein the at least one memory and the computer program code are further configured to, with the at least one processor, cause the router to remove set bit positions corresponding to the tunnels sharing the adjacency next-hop from the first tunnel bit string.

16. The router according to claim 15, wherein the plurality of tunnels is a plurality of MPLS-TE tunnels.

17. A router comprising:

at least one processor; and at least one memory including computer program code, the at least one memory and the computer program code configured to, with the at least one processor, cause the router to parse a BIER header of a received BIER packet to obtain source router identification information and destination router identification information for a tunnel bit string included in the BIER header, the tunnel bit string representing a set of tunnels, the destination router identification information including destination subdomain and set identifier information for the set of tunnels, identify a BIFT based on at least the source router identification information and the destination router identification information, the BIFT including respective bit string entries corresponding to respective tunnels, each tunnel of the respective tunnels representing a path from a source router to one respective destination router, and route the BIER packet to any subset of tunnels according to the BIFT by identifying a first bit position in the tunnel bit string included in the BIER header, determining bit string entry, of the respective bit string entries, in the BIFT based on the first bit position in the tunnel bit string, obtaining an adjacency next-hop for a payload of the received BIER packet based on the bit string entry in the BIFT, and sending a BIER packet including the payload to the adjacency next-hop.

18. The router of claim 17, wherein the at least one memory and the computer program code are further configured to, with the at least one processor, cause the router to generate a subset tunnel bit string based on the bit string entry in the BIFT, the subset tunnel bit string including set bit positions corresponding to only tunnels sharing the adjacency next-hop, generate a BIER header for the BIER packet, the BIER header including the source router identification information, the destination router identification information, and the subset tunnel bit string, and generate the BIER packet including the BIER header and the payload.

19. The router according to claim 17, wherein the at least one memory and the computer program code are further configured to, with the at least one processor, cause the router to convert the first bit position into an integer index, and look up the bit string entry in the BIFT based on the integer index.

20. The router according to claim 17, wherein the BIER header includes a subset tunnel bit string, the subset tunnel bit string including set bit positions corresponding to only tunnels sharing the router as a preceding adjacency next-hop.

21. The router according to claim 17, wherein the at least one memory and the computer program code are further configured to, with the at least one processor, cause the router to remove set bit positions corresponding to the tunnels sharing the adjacency next-hop from the tunnel bit string included in the BIER header.

22. The router according to claim 17, wherein the set of tunnels is a set of MPLS-TE tunnels and the BIFT is a Traffic Engineering-BIFT (TE-BIFT).

* * * * *